United States Patent
Kawai et al.

(10) Patent No.: US 10,609,301 B2
(45) Date of Patent: Mar. 31, 2020

(54) IMAGING CONTROL APPARATUS AND IMAGING CONTROL METHOD

(71) Applicant: SONY CORPORATION, Tokyo (JP)

(72) Inventors: Takuro Kawai, Tokyo (JP); Masatoshi Yokokawa, Kanagawa (JP); Toshiyuki Sasaki, Tokyo (JP)

(73) Assignee: SONY CORPORATION, Tokyo (JP)

(*) Notice: Subject to any disclaimer, the term of this patent is extended or adjusted under 35 U.S.C. 154(b) by 196 days.

(21) Appl. No.: 15/540,179

(22) PCT Filed: Nov. 26, 2015

(86) PCT No.: PCT/JP2015/083254
§ 371 (c)(1),
(2) Date: Jun. 27, 2017

(87) PCT Pub. No.: WO2016/114015
PCT Pub. Date: Jul. 21, 2016

(65) Prior Publication Data
US 2017/0366722 A1    Dec. 21, 2017

(30) Foreign Application Priority Data
Jan. 15, 2015 (JP) .................. 2015-005807

(51) Int. Cl.
*G01V 8/00* (2006.01)
*H04N 5/238* (2006.01)
(Continued)

(52) U.S. Cl.
CPC ............. *H04N 5/238* (2013.01); *G03B 15/02* (2013.01); *H04N 5/2256* (2013.01);
(Continued)

(58) Field of Classification Search
CPC .... G03B 15/02; H04N 5/238; H04N 5/23206; H04N 5/33; H04N 5/2256
(Continued)

(56) References Cited

U.S. PATENT DOCUMENTS

2003/0052796 A1* 3/2003 Schmidt ................ G01S 5/0027
340/905
2008/0029701 A1   2/2008 Onozawa et al.
(Continued)

FOREIGN PATENT DOCUMENTS

JP      2001-313850 A      11/2001
JP      2002-008015 A       1/2002
(Continued)

OTHER PUBLICATIONS

International Search Report and Written Opinion of PCT Application No. PCT/JP2015/083254, dated Mar. 1, 2016, 02 pages of English Translation and 08 pages of ISRWO.
Office Action for JP Patent Application No. 2016-569246, dated Dec. 24, 2019, 08 pages of Office Action and 06 pages of English Translation.

*Primary Examiner* — Georgia Y Epps
*Assistant Examiner* — Kevin Wyatt
(74) *Attorney, Agent, or Firm* — Chip Law Group

(57) ABSTRACT

An imaging control apparatus configured to effectively avoid image capturing competition in a scene in which a large number of infrared cameras capture images. The imaging control apparatus includes an image acquisition unit that acquires an infrared image generated by an infrared camera imaging reflected light of emitted infrared rays, and a control unit that controls a setting for the generation of the infrared image on the basis of a control parameter transmitted to another apparatus or received from another apparatus via a communication interface.

16 Claims, 18 Drawing Sheets

(51) Int. Cl.
  *G03B 15/02* (2006.01)
  *H04N 5/232* (2006.01)
  *H04N 5/33* (2006.01)
  *H04N 5/225* (2006.01)

(52) U.S. Cl.
  CPC .......... *H04N 5/23206* (2013.01); *H04N 5/33* (2013.01); *G03B 2206/00* (2013.01)

(58) Field of Classification Search
  USPC ................................................. 250/559.29
  See application file for complete search history.

(56) References Cited

U.S. PATENT DOCUMENTS

| | | | | |
|---|---|---|---|---|
| 2011/0195699 | A1* | 8/2011 | Tadayon .............. | H04B 5/0062 455/418 |
| 2012/0226532 | A1* | 9/2012 | Prabhakar .............. | G06Q 30/02 705/14.14 |
| 2015/0288923 | A1* | 10/2015 | Kim .................. | H04N 5/23296 348/14.05 |

FOREIGN PATENT DOCUMENTS

| | | |
|---|---|---|
| JP | 2004-276767 A | 10/2004 |
| JP | 2004-345419 A | 12/2004 |
| JP | 2006-166408 A | 6/2006 |
| JP | 2006-166409 A | 6/2006 |
| JP | 2006-319450 A | 11/2006 |
| JP | 2008-181711 A | 8/2008 |
| JP | 2009-130709 A | 6/2009 |

* cited by examiner

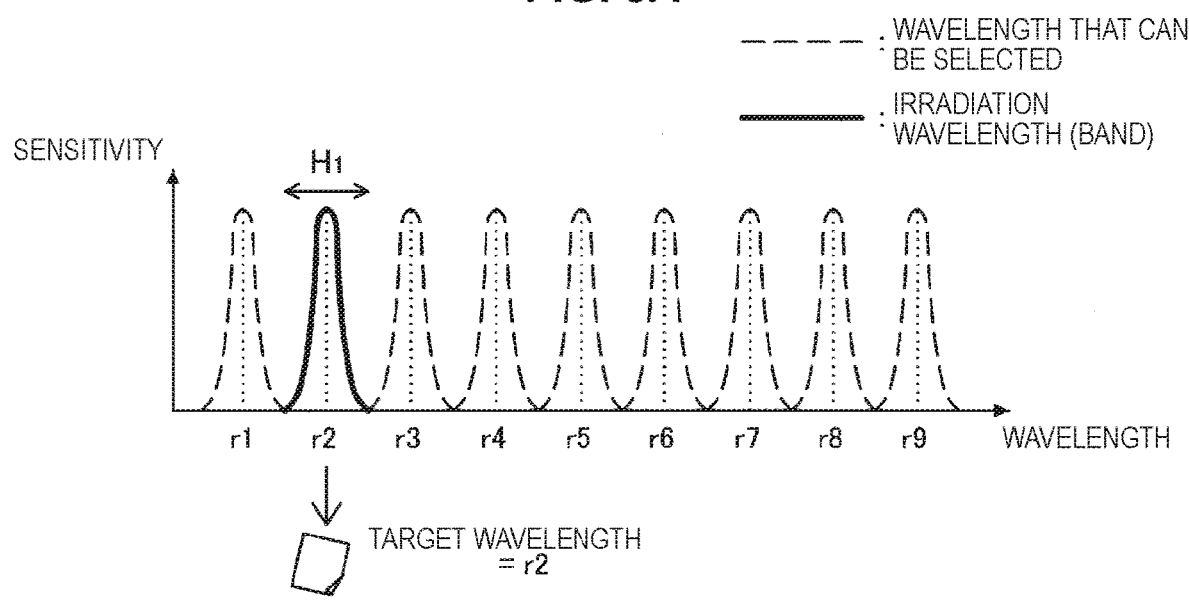
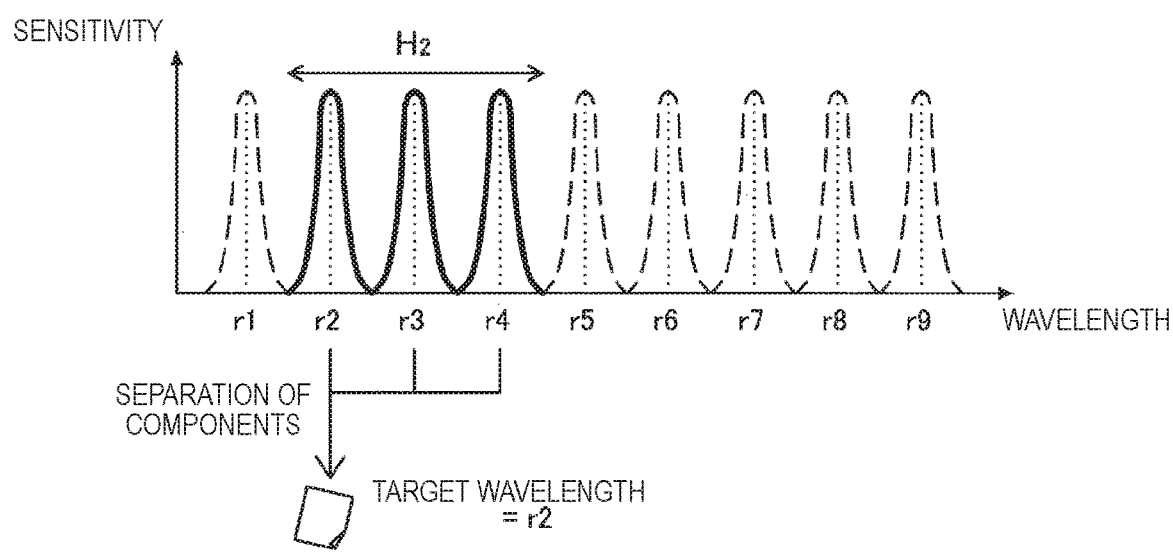

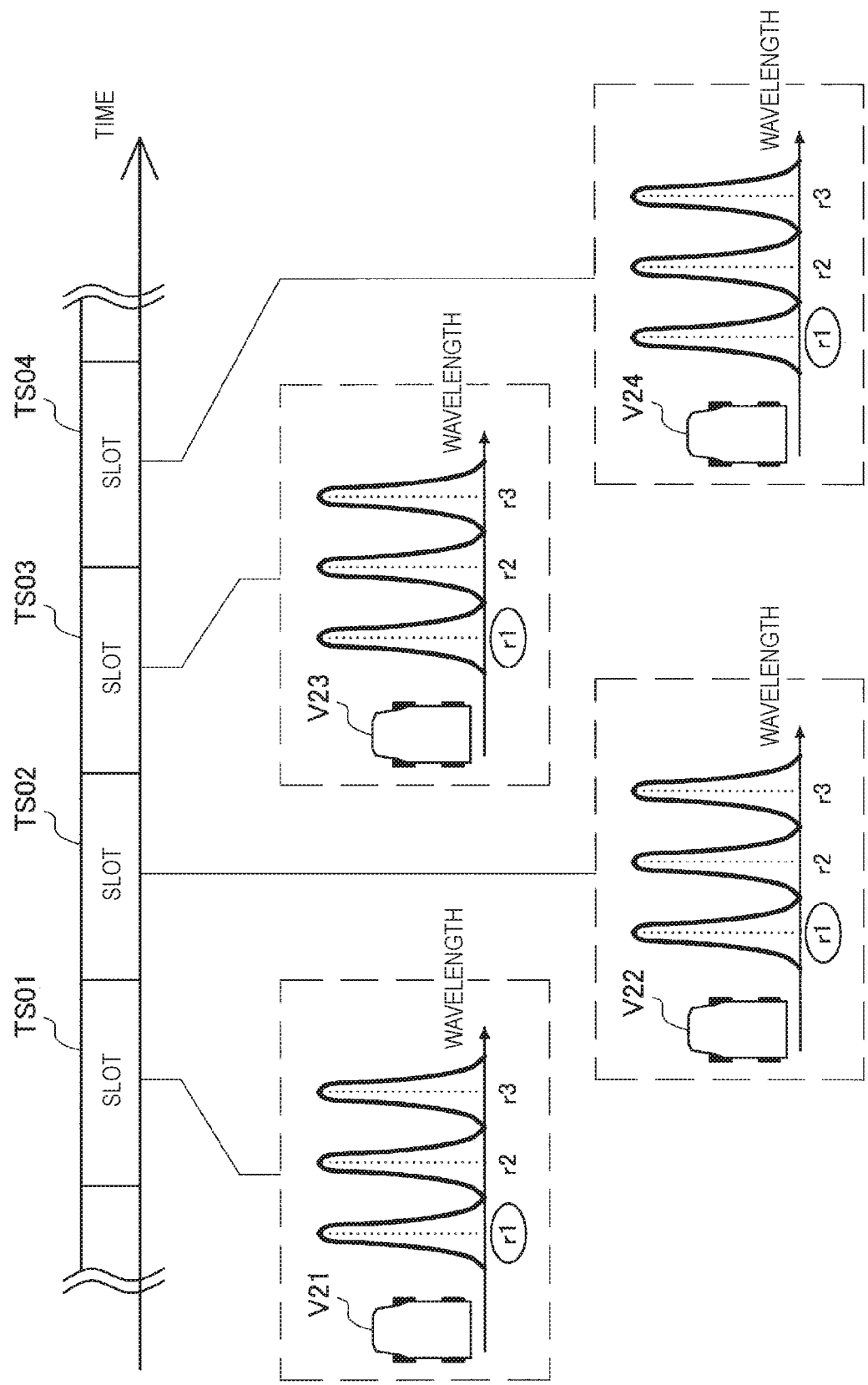

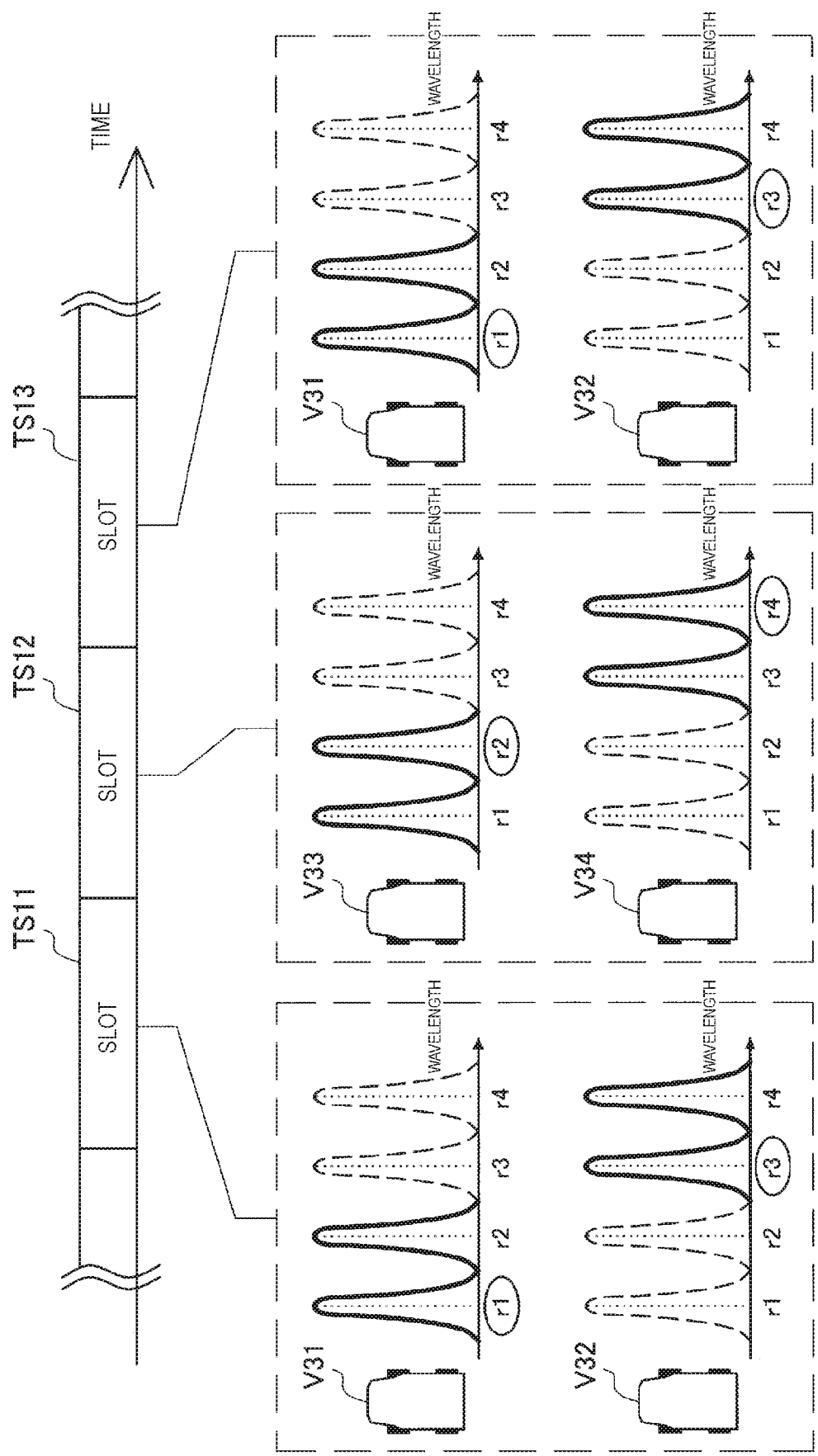

IMAGING CONTROL APPARATUS AND IMAGING CONTROL METHOD

CROSS REFERENCE TO RELATED APPLICATIONS

This application is a U.S. National Phase of International Patent Application No. PCT/JP2015/083254 filed on Nov. 26, 2015, which claims priority benefit of Japanese Patent Application No. JP 2015-005807 filed in the Japan Patent Office on Jan. 15, 2015. Each of the above-referenced applications is hereby incorporated herein by reference in its entirety.

TECHNICAL FIELD

The present disclosure relates to an imaging control apparatus, an imaging control method, and a program.

BACKGROUND ART

In the related art, images captured by infrared cameras have been used for drive assist and other purposes. In particular, relatively clear images can be obtained by using near infrared rays or short wavelength infrared rays to capture images even under poor conditions such as at night or during bad weather. In general, images of near infrared rays or short wavelength infrared rays are captured by receiving reflected light from infrared rays emitted from a camera (see Patent Literature 1, for example).

CITATION LIST

Patent Literature

Patent Literature 1: JP 2009-130709A

DISCLOSURE OF INVENTION

Technical Problem

However, infrared rays emitted from a certain camera may become a disturbance for images captured by other cameras and lead to a degradation in image quality in a scene in which a plurality of infrared cameras simultaneously capture images. Patent Literature 1 has proposed a technology for restricting polarization directions of infrared rays emitted from individual cameras in predetermined specific directions and receiving only reflected light in the polarization directions in order to avoid such image capturing competition. However, only the competition between two to three infrared cameras can be avoided just by restricting the polarization directions in practice.

Thus, an object of the technology according to the present disclosure is to realize a mechanism for effectively avoiding image capturing competition in a scene in which a large number of infrared cameras capture images.

Solution to Problem

According to the present disclosure, there is provided an imaging control apparatus including: an image acquisition unit that acquires an infrared image generated by an infrared camera imaging reflected light of emitted infrared rays; and a control unit that controls a setting for the generation of the infrared image on the basis of a control parameter transmitted to another apparatus or received from another apparatus via a communication interface.

Further, according to the present disclosure, there is provided an imaging control method including: acquiring an infrared image that is generated by an infrared camera imaging reflected light of emitted infrared rays; and controlling a setting for the generation of the infrared image on the basis of a control parameter transmitted to another apparatus or received from another apparatus via a communication interface.

Further, according to the present disclosure, there is provided a program that causes a computer to function as: an image acquisition unit that acquires an infrared image generated by an infrared camera imaging reflected light of emitted infrared rays; and a control unit that controls a setting for the generation of the infrared image on the basis of a control parameter transmitted to another apparatus or received from another apparatus via a communication interface.

Advantageous Effects of Invention

According to the technology of the present disclosure, it is possible to effectively avoid image capturing competition in a scene in which a large number of infrared cameras capture images.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5A is a first explanatory diagram illustrating an irradiation wavelength band and a target wavelength.

FIG. 5B is a second explanatory diagram illustrating an irradiation wavelength band and a target wavelength.

FIG. 6B is an explanatory diagram illustrating time separation type control.

FIG. 6C is an explanatory diagram illustrating a combination of the wavelength separation type control and the time separation type control.

MODE(S) FOR CARRYING OUT THE INVENTION

Figure 1:
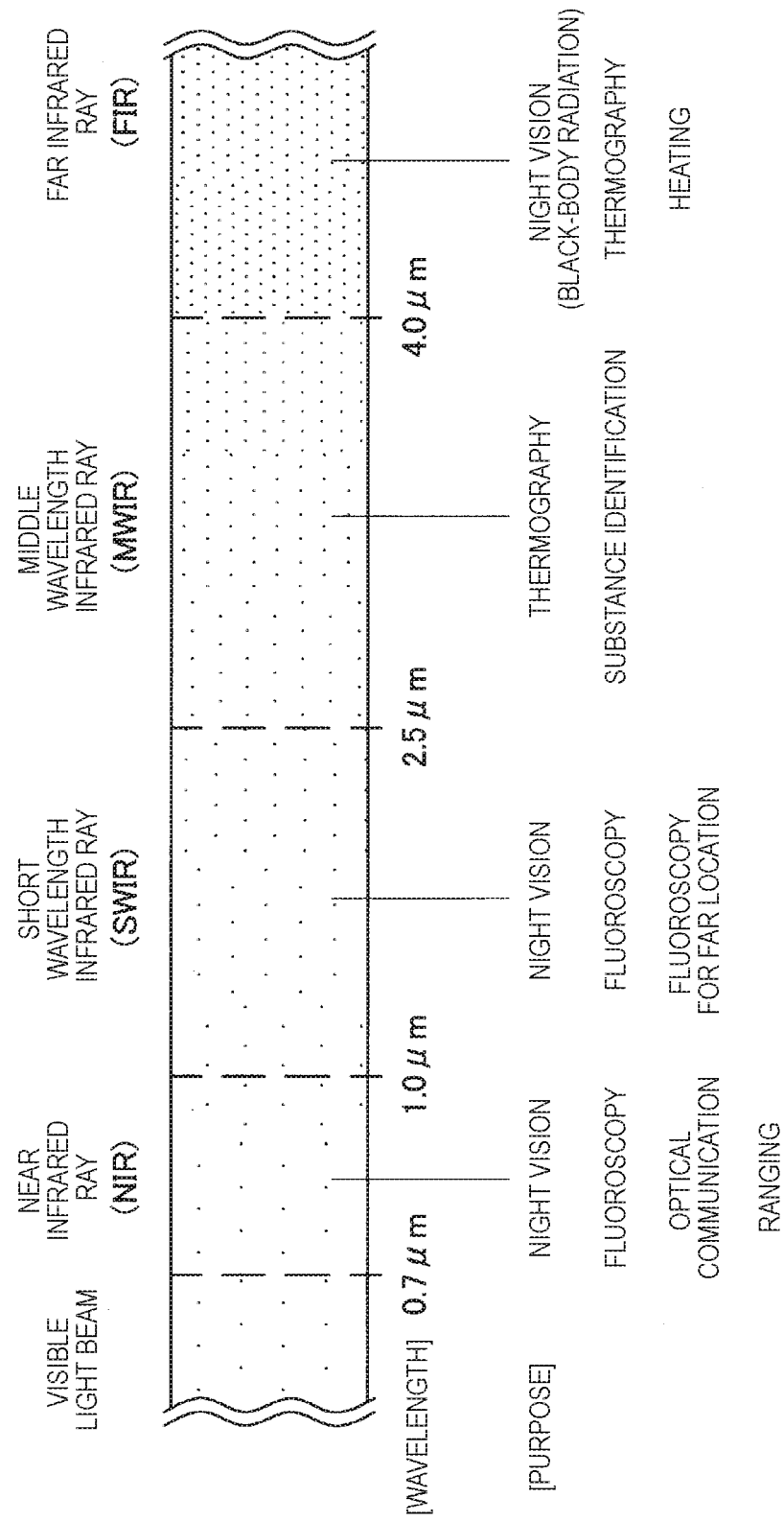
FIG. 1 is an explanatory diagram illustrating various purposes of infrared images that depend on wavelengths.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. Introduction
2. First embodiment
2-1. Hardware configuration
2-2. Functional configuration
2-3. Flow of processing
3. Second embodiment
3-1. System configuration
3-2. Functions on apparatus side
3-3. Functions on server side
3-4. Flow of processing
3-5. Application examples
4. Conclusion

1. Introduction

FIG. 1 is an explanatory diagram illustrating various purposes of infrared (IR) images depending on wavelengths. The horizontal direction in FIG. 1 corresponds to a wavelength of an infrared ray, and the wavelength increases from the left side to the right side. A light beam with a wavelength of equal to or less than 0.7 μm is a visible light beam, and human vision senses this visible light beam. An infrared ray with a wavelength within a range from 0.7 μm to 1.0 μm is classified into a near infrared ray (NIR). The near infrared ray can be used for night vision, fluoroscopy, optical communication, and ranging. An infrared ray with a wavelength within a range from 1.0 μm to 2.5 μm is classified into a short wavelength infrared ray (SWIR). The short wavelength infrared ray can also be used for night vision and fluoroscopy. A night vision device that uses a near infrared ray or a short wavelength infrared ray emits an infrared ray to the vicinity first, and receives reflected light thereof, thereby obtaining an infrared image. An infrared ray with a wavelength within a range from 2.5 μm to 4.0 μm is classified into a middle wavelength infrared ray (MWIR). Since an absorption spectrum unique to a substance appears within the wavelength range of the middle wavelength infrared ray, the middle wavelength infrared ray can be used for identifying substances. The middle wavelength infrared ray can also be used for thermography. An infrared ray with a wavelength of equal to or greater than 4.0 μm is classified into a far infrared ray (FIR). The far infrared ray can be used for night vision, thermography, and heating. An infrared ray emitted by black-body radiation from a substance corresponds to the far infrared ray. Therefore, a night vision device that uses a far infrared ray can obtain an infrared image by capturing black-body radiation from a substance without emitting an infrared ray. The boundary values of the ranges of the wavelengths illustrated in FIG. 1 are only examples. There are various definitions for boundary values of classifying the infrared rays, and advantages of the technology according to the present disclosure, which will be described later, can be achieved under any definitions.

NIR and SWIR from among the various types of infrared rays exemplified in FIG. 1, in particular, are used for obtaining clear images under poor conditions such as at night or during a bad weather. One of representative purposes is vehicle equipment, and an NIR or SWIR image provide a supplemental view such as a night view, a back view, or a surrounding view to a driver. The NIR or SWIR image can also be used for recognizing a subject that can include objects such as pedestrians, road signs, or obstacles and presenting drive assist information to the driver. In general, an infrared camera that captures the NIR or SWIR image emits an infrared ray to the vicinity at the time of imaging as described above.

However, in a scene in which a plurality of infrared cameras captures images at the same time, an infrared ray emitted from a certain camera may be disturbance for images captured by the other cameras. When two facing vehicles capture infrared images with the same target wavelength at the same time, for example, there is a risk that light emitted from the counterpart vehicle is strongly captured in the captured image and it becomes difficult to distinguish surrounding objects to be originally captured in the image. Patent Literature 1 has proposed a technology for restricting polarization directions of infrared rays emitted from individual infrared cameras in predetermined specific directions and receiving only reflected light in the polarization directions in order to avoid such image capturing competition. If, for example, both polarization directions of infrared rays emitted forward from two facing vehicles are set to be 45° in an obliquely right direction (from the respective points of view), the polarization direction of the emitted light is seen to be 45° in an obliquely left direction from the point of view of the counterpart vehicle, that is, the polarization directions of the light emitted from the two vehicles perpendicularly intersect each other. Therefore, it is possible to eliminate influences of a disturbance caused by the light emitted from the counterpart vehicle by capturing images while allowing only infrared rays in a desired polarization direction (45° in the obliquely right direction in the above example) to pass through an optical filter. However, such a method can avoid only competition between two to three infrared cameras. A large number of vehicles are present on roads in practice, and image capturing competition can occur between the vehicles.

Figure 2:
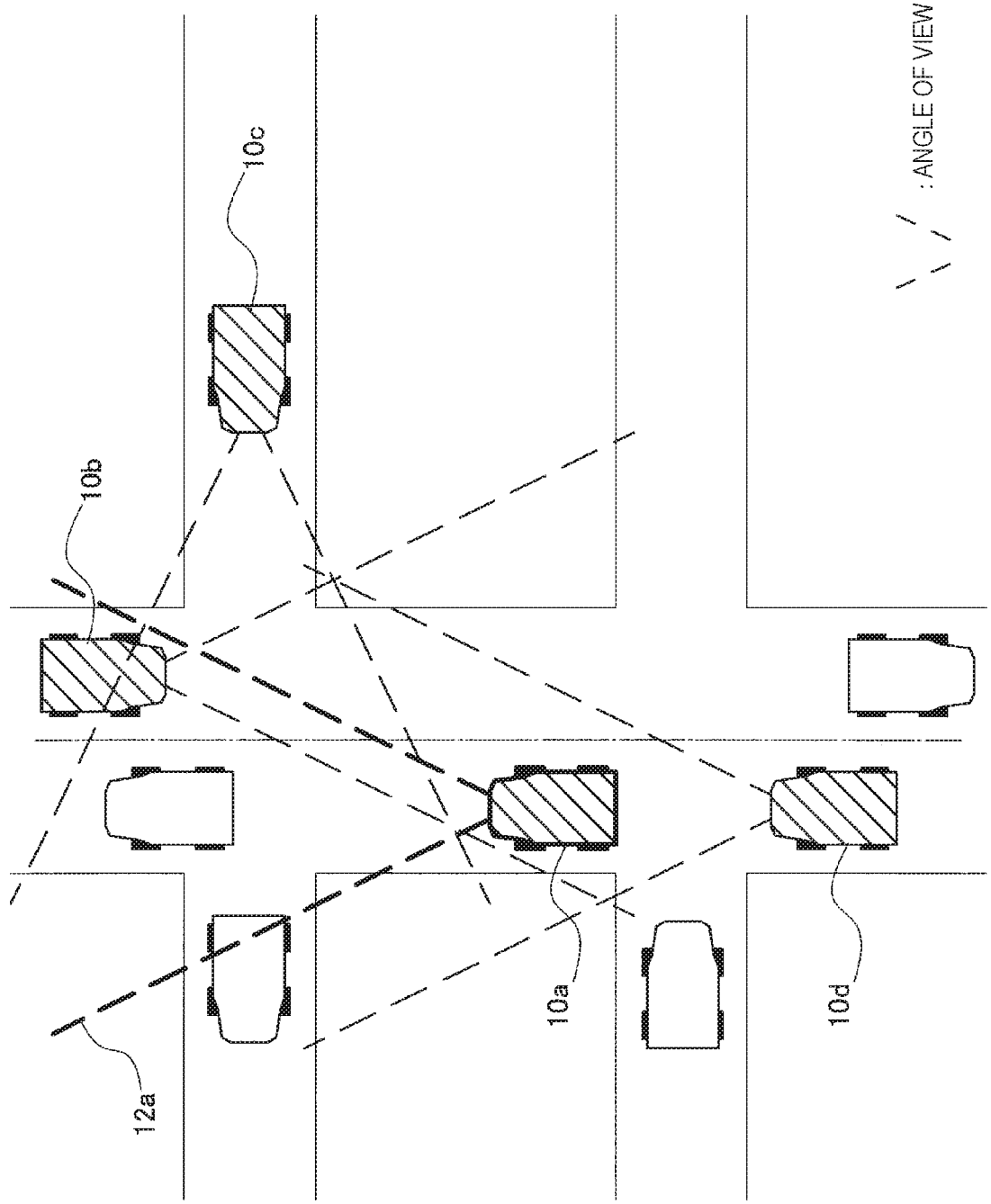
FIG. 2 is an explanatory diagram illustrating a situation in which image capturing competition occurs.

FIG. 2 is an explanatory diagram illustrating a situation in which image capturing competition occurs during use of an in-vehicle apparatus. FIG. 2 shows one road extending in a north-south direction and two roads extending in an east-west direction, and a vehicle 10a is present on the road in the north-south direction. The vehicle 10a emits infrared rays at an angle of view 12a, and an infrared camera images reflected light thereof. A large number of neighboring vehicles are present in the vicinity of the vehicle 10a, and among the vehicles, all of vehicles 10b, 10c, and 10d emit irradiation rays that reach the angle of view 12a of the vehicle 10a. Although imaging of infrared images by the vehicles 10a, 10b, 10c, and 10d compete with each other, such imaging by a large number of apparatuses cannot appropriately be separated by restricting the polarization directions of infrared rays. Thus, the specification will propose a mechanism for effectively avoiding image capturing competition in a scene in which a large number of infrared cameras capture images.

2. First Embodiment

In this section, an imaging control apparatus 100 which is an in-vehicle apparatus in one example will be described. Although the imaging control apparatus 100 partially has a configuration specialized for installation in a vehicle, a purpose of the technology according to the present disclosure is not limited to such an example. The technology according to the present disclosure can be applied not only to imaging by an in-vehicle apparatus but also to capturing infrared images by an apparatus such as a smart phone, a mobile game machine, a digital camera, a monitoring camera, or a broadcasting camera.

[2-1. Hardware Configuration]

Figure 3:
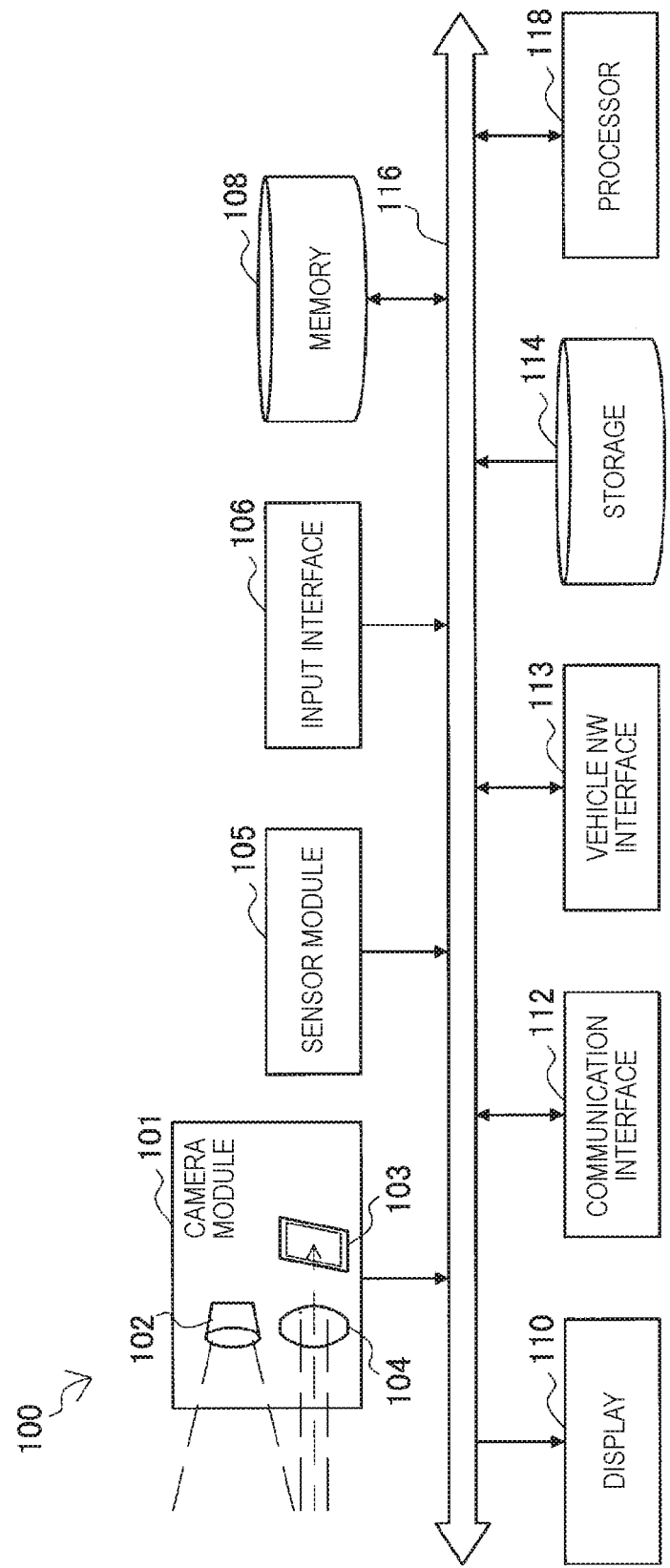
FIG. 3 is a block diagram showing an example of a hardware configuration of an imaging control apparatus according to a first embodiment.

FIG. 3 is a block diagram showing an example of a hardware configuration of the imaging control apparatus 100 according to a first embodiment. Referring to FIG. 3, the imaging control apparatus 100 is provided with a camera module 101, a sensor module 105, an input interface 106, a memory 108, a display 110, a communication interface 112, a vehicle network (NW) interface 113, a storage 114, a bus 116, and a processor 118.

(1) Camera Module

The camera module 101 is a module that images an object in an NIR region or an SWIR region. The camera module 101 has a light emitter 102 that emits infrared rays with wavelengths that belong to a certain irradiation wavelength band in an angle of view direction, and an imaging element array 103 that senses an infrared ray with a target wavelength (classified into a near-infrared ray or a short wavelength infrared ray). The camera module 101 may further have an optical filter 104 that is arranged in front of the imaging element array 103 and blocks light with a wavelength outside a passband. In an example which will be described later, the optical filter 104 is a variable filter that has a variably controlled passband. The camera module 101 generates an infrared image by emitting infrared rays from the light emitter 102 periodically or in response to a trigger such as a user input, and capturing the infrared rays reflected by an object or a background thereof. A series of infrared images generated by the camera module 101 can form a moving image. The camera module 101 may further have an imaging element array for capturing a visible light image.

(2) Sensor Module

The sensor module 105 is a module that has a sensor group that can include a position measurement sensor, an acceleration sensor, and a depth sensor. The position measurement sensor measures a current position of the camera module 101 (or a current position of a vehicle in which the imaging control apparatus 100 is installed) on the basis of, for example, a GPS signal from a global positioning system (GPS) satellite or a wireless signal from a wireless access point. The acceleration sensor measures three-axis acceleration applied to the camera module 101 (or the vehicle). The depth sensor measures a distance (that is, a depth) to an object that is present in the angle of view of the camera module 101. Sensor data generated by the sensor module 105 can be utilized to control imaging, which will be described later.

(3) Input Interface

The input interface 106 is used by a user to operate the imaging control apparatus 100 or input information to the imaging control apparatus 100. For example, the input interface 106 may include an input device such as a touch sensor, a key pad, a button, or a switch. The input interface 106 may include a microphone for inputting sound and a sound recognition module. The input interface 106 may include a remote control module for receiving a command selected by the user from a remote device.

(4) Memory

The memory 108 is a storage medium that can include a random access memory (RAM) and a read only memory (ROM). The memory 108 is coupled to the processor 118 and stores a program and data for processing to be executed by the processor 118.

(5) Display

The display 110 is a display module that has a screen for displaying an image. For example, the display 110 may be a liquid crystal display (LCD), an organic light-emitting diode (OLED), or a cathode ray tube (CRT).

(6) Communication Interface

The communication interface 112 is a module that relays communication between the imaging control apparatus 100 and other apparatuses. The communication interface 112 establishes a communication connection in accordance with an arbitrary wireless communication protocol.

(7) Vehicle NW Interface

The vehicle NW interface 113 is a module that relays communication with a vehicle network of the vehicle in which the imaging control apparatus 100 is installed. For example, the vehicle NW interface 113 is connected to the vehicle network via a terminal, which is not illustrated and acquires data generated on the vehicle side, such as vehicle speed data and steering angle data.

(8) Storage

The storage 114 is a storage device that accumulates image data and stores a database that is utilized to control processing to be executed by the imaging control apparatus 100. The storage 114 has a built-in storage medium such as a semiconductor memory or a hard disk. The program and the data described in the specification may be acquired from a data source (for example, a data server, a network storage, or an external memory) outside the imaging control apparatus 100.

(9) Bus

The bus 116 connects the camera module 101, the sensor module 105, the input interface 106, the memory 108, the display 110, the communication interface 112, the vehicle NW interface 113, the storage 114, and the processor 118 with each other.

(10) Processor

The processor 118 is a processing module such as a central processing unit (CPU) or a digital signal processor (DSP). The processor 118 causes functions for avoiding image capturing competition with other apparatuses located in the vicinity thereof, which will be described later, to operate by executing the program stored in the memory 108 or another storage medium.

[2-2. Functional Configuration]

Figure 4:
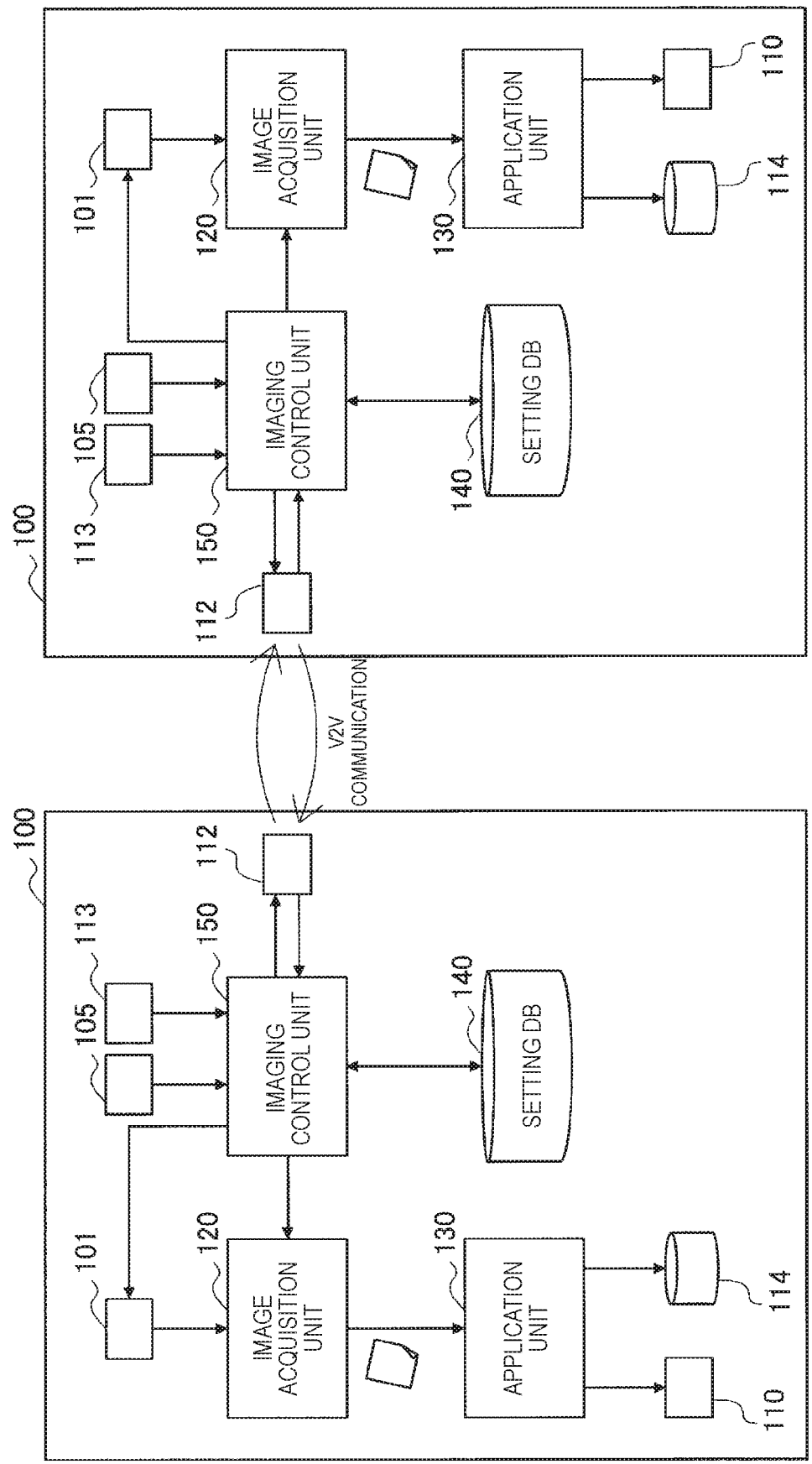
FIG. 4 is an explanatory diagram illustrating an example of a configuration of a theoretical function of the imaging control apparatus according to the first embodiment.

FIG. 4 is an explanatory diagram illustrating an example of a configuration of theoretical functions realized by the components of the imaging control apparatus 100 shown in FIG. 3 working in conjunction with each other. FIG. 4 shows two imaging control apparatuses 100, and these imaging control apparatuses 100 communicate with each other via the communication interfaces 112. Such communication between the in-vehicle apparatuses will be referred to as inter-vehicle communication or vehicle-to-vehicle (V2V) communication. Although only two imaging control apparatus 100 are shown in FIG. 4, more apparatuses are involved in V2V communication in practice in the embodiment. The communication between the in-vehicle apparatuses may not necessarily be performed via a direct communication link between the two in-vehicle apparatuses. For example, a relay apparatus that is set on the road side may relay communication signals, or a certain other in-vehicle apparatus may relay communication signals between the two in-vehicle apparatuses. Each of the imaging control apparatuses 100 is provided with an image acquisition unit 120, an application unit 130, a setting database (DB) 140, and an imaging control unit 150.

(1) Image Acquisition Unit

The image acquisition unit 120 acquires an infrared image that is generated by the imaging element array 103 imaging reflected light of infrared rays emitted by the light emitter 102 in the camera module 101. Then, the image acquisition unit 120 outputs the acquired image to the application unit 130. The image acquisition unit 120 may execute preliminary processing, such as amplification of image signals, demosaicing, noise removal, and separation of wavelength components, on the infrared image.

FIGS. 5A and 5B are explanatory diagrams illustrating an irradiation wavelength band and a target wavelength related to an infrared image acquired by the image acquisition unit 120. In FIGS. 5A and 5B, the horizontal axis represents wavelengths of infrared rays, and the vertical axis represents sensitivity of an imaging element. The dotted line graph represents a wavelength that can be selected by the camera module 101. According to the example shown herein, the camera module 101 can emit infrared rays with an arbitrary combination of nine wavelengths r1 to r9 and image reflected light of the emitted infrared rays. In the first example shown in FIG. 5A, the camera module 101 emits infrared rays in an irradiation wavelength band $H_1$ centered at the wavelength r2, which is shown by a thick solid line, and captures an image with an imaging element array that has a sensitivity peak at the wavelength r2. In this case, the target wavelength is the wavelength r2, and the infrared rays with wavelengths other than the target wavelength can be blocked by the optical filter in the camera module 101. In the second example shown in FIG. 5B, the camera module 101 emits infrared rays in a composite irradiation wavelength band $H_2$ that includes the wavelengths r2, r3, and r4, which are shown by the thick solid line, and captures an image with a plurality of imaging element arrays that have sensitivity peaks at the wavelengths r2, r3, and r4, respectively. Then, the image acquisition unit 120 performs signal processing (typically, a filter operation for separating mixed colors) for separating components with the wavelength r2 from original images captured at the wavelengths r2, r3, and r4, respectively and generates an infrared image with the wavelength r2. Although the target wavelength is also the wavelength r2 in this case, the infrared rays with the wavelengths r3 and r4 are not blocked by the optical filter, and components thereof are removed from the infrared image by the aforementioned signal processing. In the embodiment, such setting of the irradiation wavelength band of the infrared rays and the target wavelength of the infrared image is controlled by the imaging control unit 150, which will be described later. In addition, imaging timing of the infrared image and irradiation intensity of the infrared rays can be controlled by the imaging control unit 150.

(2) Application Unit

The application unit 130 executes an application function using an infrared image input from the image acquisition unit 120. For example, the application function executed by the application unit 130 may be a drive assist function such as an advanced driver assistance system (ADAS). In such a case, the application unit 130 can detect a pedestrian or an object (such as another vehicle) and issue a collision alert, or present parking assist information to a user on a screen on the basis of the infrared image input from the image acquisition unit 120. The application unit 130 may display the input infrared image on the screen of the display 110 without any change or may store the infrared image in the storage 114 after compression coding or without compression.

(3) Setting DB

The setting DB 140 is a database that stores various kinds of data to be utilized by the imaging control unit 150 to control a setting related to the imaging. The data stored in the setting DB 140 can include setting candidate information indicating setting candidates (also referred to as capabilities) that can be selected by the camera module 101 and current setting information indicating setting content of the camera module 101 at the time. Furthermore, the setting DB 140 can store neighboring apparatus information that is acquired through information exchange with neighboring apparatuses via the communication interface 112. The neighboring apparatus information can include, for example, an identifier of each of the neighboring apparatuses, setting candidate information, current setting information, position information, and speed information.

(4) Imaging Control Unit

The imaging control unit 150 controls a setting for generating an infrared image on the basis of the control parameter transmitted to another apparatus or received from another apparatus via the communication interface 112 in order to avoid image capturing competition between a plurality of apparatuses. In the embodiment, another apparatus may be another imaging control apparatus 100 that is present in the vicinity of the camera module 101 (referred to as a neighboring apparatus in the following description). The control performed by the imaging control unit 150 includes wavelength separation type control or time separation type control. In the wavelength separation type control, the irradiation wavelength band of the infrared rays and the target wavelength of the infrared image are controlled by the imaging control unit 150. In the time separation type control, imaging timing of the infrared image is controlled by the imaging control unit 150. A combination of the wavelength separation type control and the time separation type control is also possible. Furthermore, the imaging control unit 150 can also control irradiation intensity of the infrared rays.

In one example, an irradiation wavelength band $H_{neighbor}$ selected by a neighboring apparatus is indicated by a control parameter received from the neighboring apparatus. Meanwhile, the image acquisition unit 120 acquires the infrared image generated with a target wavelength $r_{local}$. The target wavelength $r_{local}$ belongs to an irradiation wavelength band $H_{local}$. In the wavelength separation type control, the imaging control unit 150 then selects the target wavelength $r_{local}$ for the imaging by the own apparatus so that an influence of emitted light in the irradiation wavelength band $H_{neighbor}$ on the infrared image acquired by the image acquisition unit 120 is reduced. Typically, the selected target wavelength $r_{local}$ is a wavelength that is not included in the irradiation wavelength band $H_{neighbor}$. Furthermore, the control parameter received from the neighboring apparatus can also indicate the target wavelength $r_{neighbor}$ for an infrared image generated by the neighboring apparatus. Then, the imaging control unit 150 selects the irradiation wavelength band $H_{local}$ for the imaging by the own apparatus such that an influence of the irradiation wavelength band $H_{local}$ on the infrared image generated by the neighboring apparatus is reduced. Typically, the selected irradiation wavelength band $H_{local}$ is a wavelength band that does not include the target wavelength $r_{neighbor}$.

The imaging control unit 150 sets the selected irradiation wavelength band $H_{local}$ and the target wavelength $r_{local}$ in the camera module 101. If an infrared image is generated by imaging infrared rays that have passed through a variable filter, the imaging control unit 150 sets the variable filter such that a passband includes the selected target wavelength $r_{local}$. Alternatively or additionally, if the infrared image is generated by extracting components with the target wavelength from original images output from the camera module 101, the imaging control unit 150 sets the image acquisition unit 120 such that components with the selected target wavelength $r_{local}$ are extracted from the original images. The imaging control unit 150 transmits the control parameters that indicate the irradiation wavelength band $H_{local}$ and the target wavelength $r_{local}$ selected by the imaging control unit 150 itself to the neighboring apparatus.

Figure 6A:
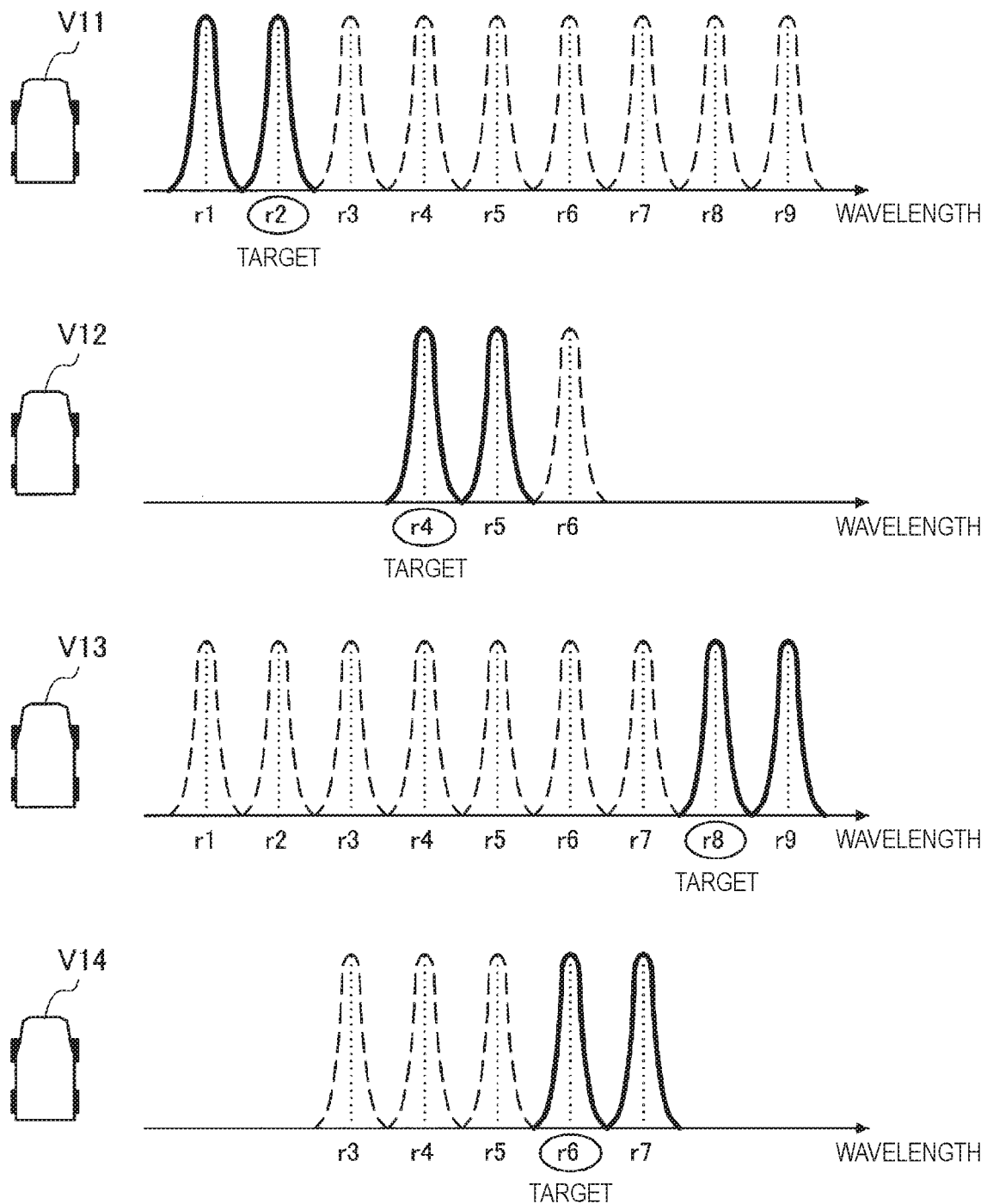
FIG. 6A is an explanatory diagram illustrating wavelength separation type control.

FIG. 6A is an explanatory diagram illustrating the wavelength separation type control. Referring to FIG. 6A, four vehicles V11, V12, V13, and V14 that are located near each other are shown, and image capturing competition among these vehicles is avoided by the wavelength separation type control. For example, an infrared camera in the vehicle V11 emits infrared rays including the wavelengths r1 and r2 and generates an infrared image with the target wavelength r2. An infrared camera in the vehicle V12 emits infrared rays including the wavelengths r4 and r5 and generates an infrared image with the target wavelength r4. An infrared camera in the vehicle V13 emits infrared rays including the wavelengths r8 and r9 and generates an infrared image with the target wavelength r8. An infrared camera in the vehicle V14 emits infrared rays including the wavelengths r6 and r7 and generates an infrared image with the target wavelength r6. It is possible to avoid light emitted from a certain apparatus acting as a disturbance for images captured by the other apparatuses by selecting different irradiation wavelength bands and target wavelengths among the neighboring apparatuses in this manner.

In another example, imaging timing $T_{neighbor}$ selected by a neighboring apparatus is indicated by a control parameter received from the neighboring apparatus. Meanwhile, the image acquisition unit 120 acquires an infrared image generated by imaging reflected light of infrared rays emitted at imaging timing $T_{local}$. The imaging timing can be represented, for example, by a time offset from a predetermined time reference and a cycle (or a number applied to a time slot). In the time separation type control, the imaging control unit 150 then selects the imaging timing $T_{local}$ such that the imaging timing $T_{local}$ does not interfere with the imaging timing $T_{neighbor}$ and sets the selected imaging timing $T_{local}$ in the camera module 101. The imaging control unit 150 transmits a control parameter indicating the imaging timing $T_{local}$ that has been selected by the imaging control unit 150 itself to the neighboring apparatus.

FIG. 6B is an explanatory diagram illustrating the time separation type control. Referring to FIG. 6B, four vehicles V21, V22, V23, and V24 that are located near each other are shown, and image capturing competition among these vehicles is avoided by the time separation type control. For example, an infrared camera in the vehicle V21 generates an infrared image with the target wavelength r1 in a time slot TS01. An infrared camera in the vehicle V22 generates an infrared image with the target wavelength r1 in a time slot TS02 that follows the time slot TS01. An infrared camera in the vehicle V23 generates an infrared image with the target wavelength r1 in a time slot TS03 that follows the time slot TS02. An infrared camera in the vehicle V24 generates an infrared image with the target wavelength r1 in a time slot TS04 that follows the time slot TS03. It is possible to prevent light emitted from a certain apparatus from acting as a disturbance for images captured by the other apparatuses even if the common target wavelength is used by capturing images at different timings among the neighboring apparatuses in this manner. In addition, a degree of separation (how many apparatuses capture images with the same wavelength at separate timing without competing) that can be achieved by the time separation type control is in a tradeoff relationship with a movie frame rate and depends on a time synchronization performance among the apparatuses. The time synchronization among the apparatuses may be performed by any synchronization method using an existing communication protocol.

FIG. 6C is an explanatory diagram illustrating a combination of the wavelength separation type control and the time separation type control. In the example of FIG. 6C, image capturing competition among four vehicles V31, V32, V33 and V34 is avoided. For example, an infrared camera in the vehicle V31 and an infrared camera in the vehicle V32 respectively generate infrared images with the target wavelength r1 and the target wavelength r3 in a time slot TS11. An infrared camera in the vehicle V33 and an infrared camera in the vehicle V34 respectively generate infrared images with the target wavelength r2 and the target wavelength r4, in a time slot TS12 that follows the time slot TS11. The infrared camera in the vehicle V31 and the infrared camera in the vehicle V32 respectively generate infrared images again with the target wavelength r1 and the target wavelength r3 in a time slot TS13 that follows the time slot TS12. If the apparatuses capture images in different combinations of wavelengths and imaging timings as described above, the number of apparatuses for which separation can be performed achieves a product of the number of wavelength candidates that can be selected and the number of imaging timing candidates. An NIR region and an SWIR region can be separated into a number of target wavelength candidates much larger than 10, although it depends on restrictions such as a required performance and apparatus manufacturing cost. Thus, on the assumption that a degree of separation in a wavelength direction is 10 (maximum of ten apparatuses can simultaneously capture images with no competition) and a degree of separation in a time direction is 2, for example, a degree of separation of 20 (=10×2) is achieved by combining the wavelength separation type control and the time separation type control.

Figure 6D:
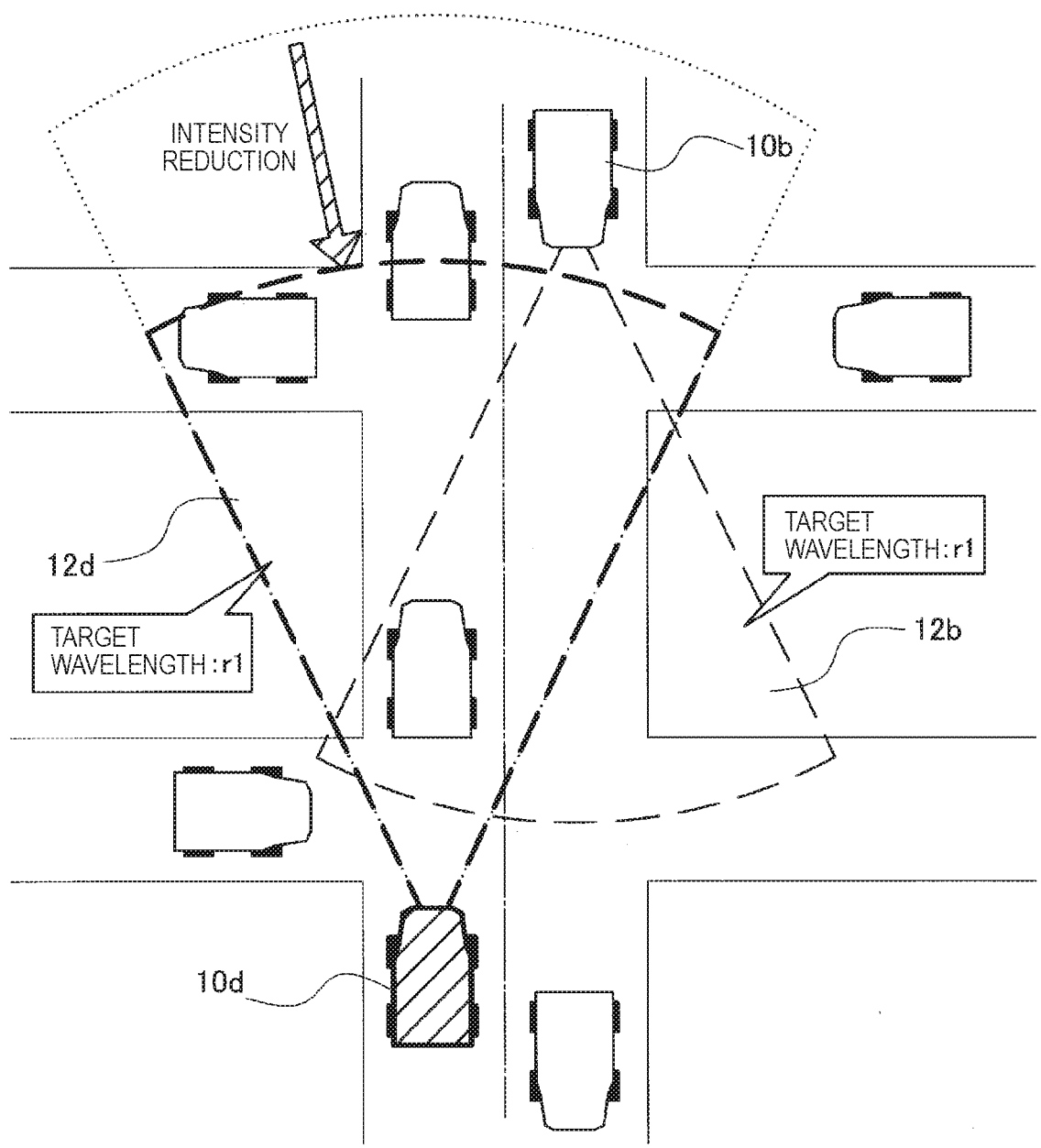
FIG. 6D is an explanatory diagram illustrating space separation type control.

FIG. 6D is an explanatory diagram illustrating the space separation type control. In the space separation type control, position data and speed data of a neighboring apparatus are represented by control parameters received from the neighboring apparatus. The position and the speed of the apparatus itself are measured by the sensor module 105 or are indicated by data acquired via the vehicle NW interface 113. Then, the imaging control unit 150 selects irradiation intensity of the infrared rays in the camera module 101 so that an influence of an emission of infrared rays from the camera module 101 on an infrared image generated by the neighboring apparatus is reduced. For example, initial irradiation intensity of infrared rays of a vehicle 10*d* is set to such a level that the emitted light reaches a vehicle 10*b* in the example of FIG. 6D. Both a target wavelength set for an infrared camera in the vehicle 10*d* and a target wavelength set for an infrared camera in the vehicle 10*b* are the wavelength r1. The imaging control apparatus 100 in the vehicle 10*d* determines that there is a possibility that the emission of the infrared rays from the imaging control apparatus 100 itself may have a significantly adverse effect on the vehicle 10*b* in such a situation on the basis of position data and speed data of both of the apparatuses and reduces the irradiation intensity of the infrared rays from the vehicle 10*d* (see the arrow in the drawing). As a result, the influence of the emitted light of the infrared rays from the vehicle 10*d* on the infrared image captured by the vehicle 10*b* is reduced.

In addition to the separation of the apparatuses in one or more categories among the aforementioned wavelength, a time, and a space, the imaging control unit 150 may employ separation depending on polarization directions. In such a case, the imaging control unit 150 can determine a polarization direction selected by the neighboring apparatus from the control parameter received from the neighboring apparatus, select a polarization direction that does not overlap with the determined polarization direction of the neighboring apparatus, and set the selected polarization direction in the camera module 101. The imaging control unit 150 may transmit the control parameter indicating the polarization direction selected by the imaging control unit 150 itself to the neighboring apparatus. On the assumption that, for example, the degree of separation in the wavelength direction is 10, the degree of separation in the time direction is 2, and two more polarization directions can be selected, a degree of separation of 40 (=10×2×2) is achieved by combining these three categories.

The above description was given from the viewpoint of from which category apparatuses can be separated from each other in order to avoid competition of capturing infrared images by the plurality of apparatuses in relation to the function of the imaging control unit 150. Next, a description will be given from the viewpoint of which an apparatus has priority in establishing a setting.

According to the basic idea of the embodiment, the imaging control unit 150 selects a setting that is at least partially different from the setting of a neighboring apparatus for generating an infrared image to be acquired by the image acquisition unit 120 if a setting of an infrared image generated by a neighboring apparatus with higher setting priority than that of the own apparatus is specified by a control parameter received via the communication interface 112. The imaging control unit 150 transmits the control parameter for specifying the setting of the own apparatus via the communication interface 112 in order to cause a neighboring apparatus with lower setting priority than that of the own apparatus to use a setting that is at least partially different from the setting for the infrared image to be acquired by the image acquisition unit 120.

In one example, the imaging control unit 150 may determine the setting priority on the basis of degrees of freedom in setting the individual apparatuses. The degrees of freedom in setting are specified by setting candidate information exchanged among the apparatuses. Typically, lower setting priority is given to an apparatus with a higher degree of freedom in setting since the apparatus with the higher degree of freedom in setting has more room for selecting different settings while avoiding a setting selected by the other apparatuses. Here, the degree of freedom in setting corresponds to the number of setting candidates that can be selected by a certain apparatus to generate an infrared image. Referring again to FIG. 5A, for example, since the vehicle V11 can select nine target wavelengths, the degree of freedom in setting for the vehicle V11 is equal to nine in the wavelength separation type control. Similarly, the degrees of freedom in setting for the vehicles V12, V13, and V14 are respectively equal to three, nine, and five. Therefore, the highest setting propriety is given to the vehicle V12, and the second highest setting priority is given to the vehicle V14 in the example of FIG. 5A. Since the vehicles V11 and V13 have the same degree of freedom in setting, the setting priority for these vehicles can be adjusted so that there is a difference therebetween on the basis of criteria other than the degrees of freedom in setting. The criteria other than the degrees of freedom in setting may include a setting change risk, for example, as will be described later. Also, priority may be placed on an apparatus that first declares selection of a specific setting (first-come first-served basis). Also, a setting priority may be adjusted on the basis of a positional relationship between apparatuses such as traffic lanes, traveling directions, or front/back positions.

In another example, the imaging control unit 150 may determine the setting priority on the basis of setting change risks that depend on moving speeds or positions of individual apparatuses. In general, a change in a target wavelength or an imaging timing can be a factor of a risk that leads to temporal turbulence in an infrared image. Therefore, changing a setting of a target wavelength or an imaging timing in an apparatus often is not desirable in a situation in which traveling safety of a vehicle is more emphasized. Thus, for example, the imaging control unit 150 evaluates a setting change risk of an apparatus that moves at a higher moving speed or an apparatus that is located closer to a location with a high accident occurrence rate (for example, an intersection or a curve) to be high, and gives a higher setting priority to the apparatus with the higher setting change risk. A moving speed of the apparatus may be a speed that is measured at a single point of time or may be an average value of speeds measured at a plurality of times. A setting priority of apparatuses with the same setting change risk can be adjusted on the basis of criteria other than the setting change risk (for example, the aforementioned degrees of freedom in setting, traffic lanes, or traveling directions; first-come first-served basis may be employed).

Regardless what kind of criteria is used to determine the setting priority, the imaging control unit 150 mutually compares a setting priority in a group of certain apparatuses that are dynamically selected. For example, the imaging control unit 150 detects one or more neighboring apparatuses via the communication interface 112. The detection of the neighboring apparatuses may be performed by some existing method such as by receiving broadcast signals transmitted from the neighboring apparatuses or by receiving response signals in response to search signals transmitted from the communication interface 112. Next, the imaging control unit 150 selects at least one neighboring apparatus with which competition is to be avoided on the basis of a relative positional relationship between the camera module 101 and the detected one or more neighboring apparatuses. Then, the imaging control unit 150 executes the aforementioned wavelength separation type control, the time separation type control, or the combination thereof for generating an infrared image so that a setting that is at least partially different from that of the at least one selected neighboring apparatus is used.

Figure 7:
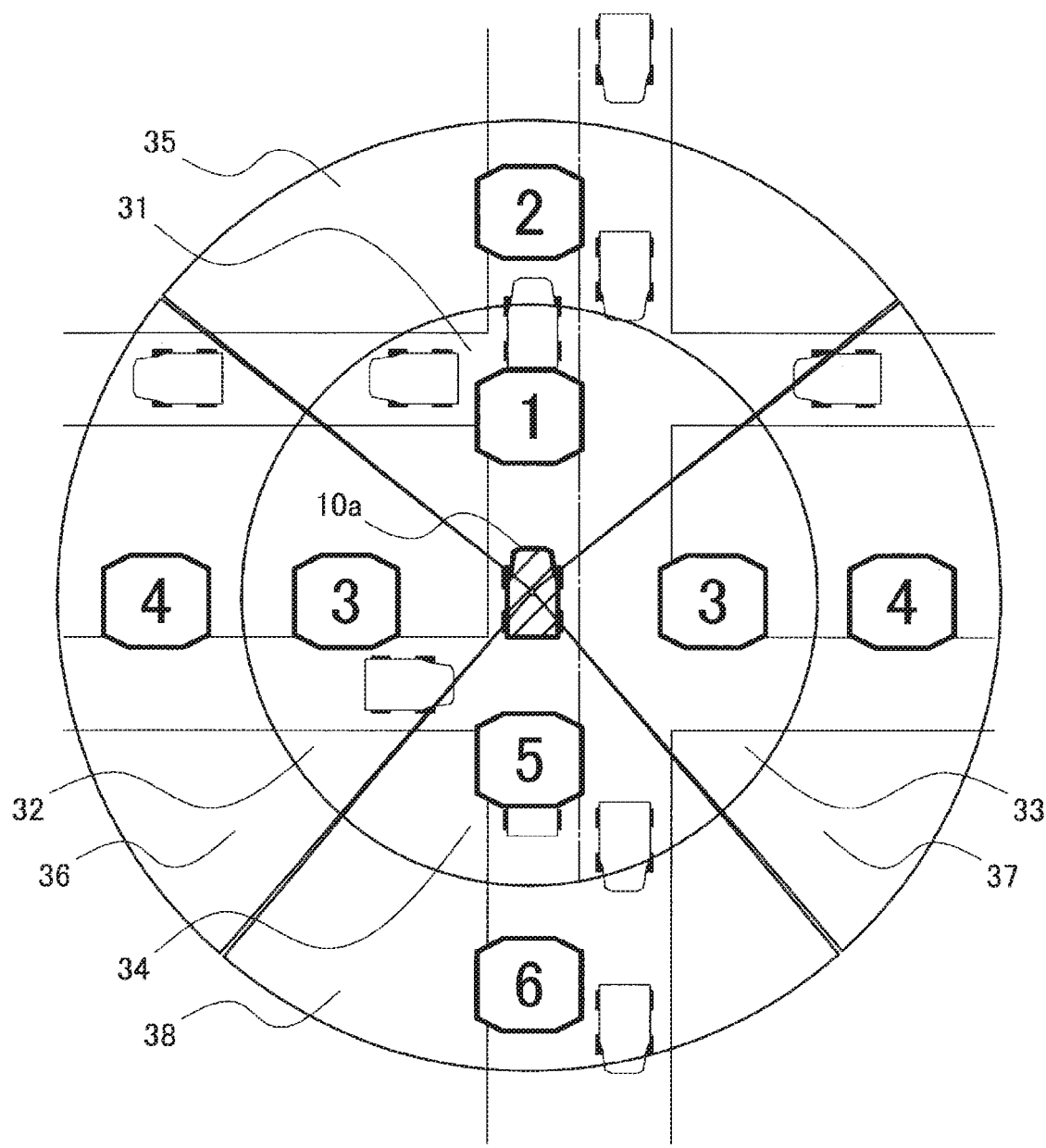
FIG. 7 is an explanatory diagram illustrating an example of a selection of a neighboring apparatus on the basis of relative positional relationships.

FIG. 7 is an explanatory diagram for illustrating an example of a selection of a neighboring apparatus on the basis of a relative positional relationship. Referring to FIG. 7, two concentric circles centered at a current position of a vehicle 10a are shown, and the inner circle is sectioned into four sections 31, 32, 33, and 34, and a ring-shaped portion between the inner circle and the outer circle is sectioned into four sections 35, 36, 37, and 38. Numerical values from 1 to 6 applied to the sections in the drawing represent an order of selection. For example, the sections in the drawing are arranged in the order of selection as follows: the section 31 (the order of selection="1"), the section 35 (the order of selection="2"), the sections 32 and 33 (the order of selection="3"), the sections 36 and 37 (the order of selection="4"), the section 34 (the order of selection="5"), and the section 38 (the order of selection="6"). As can be understood from this example, a higher order of selection (to be selected with higher priority) is given to a section located closer to an angle of view of the own apparatus according to the basic idea. Then, the imaging control unit 150 repeats the selection of neighboring apparatuses in the order from a neighboring apparatus located in a section with a smaller value as the order of selection until the number of selected apparatuses exceeds a predefined threshold value. Positions of the neighboring apparatuses may be positions when position information is exchanged or may be future positions that are expected by also taking speed information into consideration. The threshold value may be fixedly defined. Alternatively, the threshold value may be dynamically set depending on locations (for example, the threshold value becomes greater at intersections), degrees of congestion (the threshold value becomes greater at a time of congestion), or degrees of freedom in setting of the apparatuses. It is possible to include a neighboring apparatus that is present at a location with a high possibility that light emitted therefrom contributes as a disturbance as a target of competition avoidance with priority, by selecting neighboring apparatuses as targets of the competition avoidance on the basis of such positional relationships.

Note that the definitions of the sections and the order of selection shown in FIG. 7 are only examples, and different definitions of sections and orders of selection may be used. For example, although it is assumed that the infrared camera of in the vehicle 10a is directed to the front side in FIG. 7, the highest order of selection can be given to a section in a side surface direction for a side view camera, and the highest order of selection can be given to a section on the rear side for a rear view camera. The imaging control unit 150 may determine the order of selection in consideration of directions of the neighboring apparatuses in addition to the positions of the neighboring apparatuses. Specifically, the order of selection "1" can be given to an apparatus that faces the vehicle 10a, and the order of selection "5" can be given to an apparatus that faces in the same direction as the vehicle 10a among neighboring apparatuses located in the section 31 in the example of FIG. 7. Similarly, the order of selection "2" can be given to an apparatus that faces the vehicle 10a, and the order of selection "6" can be given to an apparatus that faces the same direction as the vehicle 10a among neighboring apparatuses located in the section 35.

[2-3. Flow of Processing]
(1) Imaging Control Processing

Figure 8:
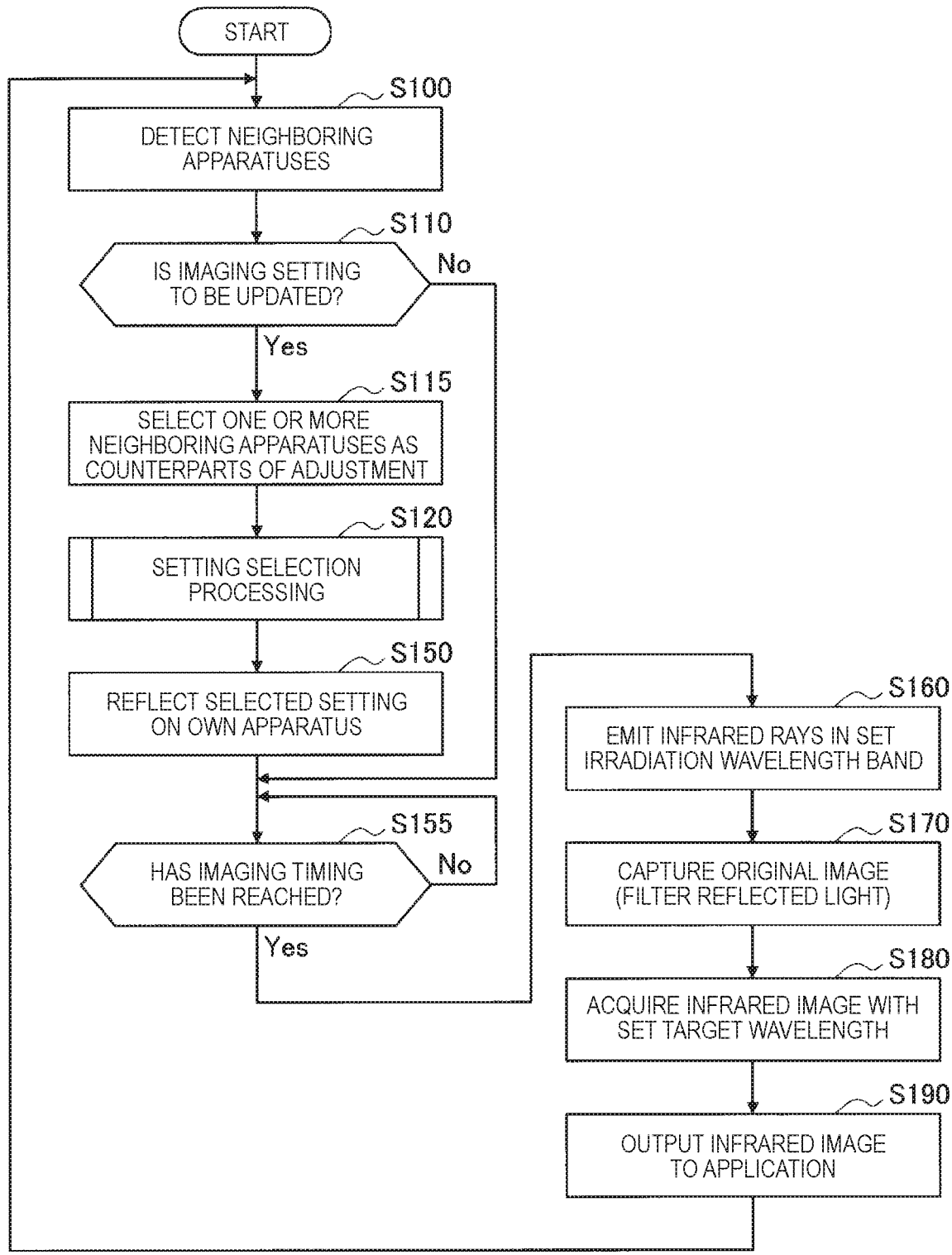
FIG. 8 is a flowchart showing an example of a flow of imaging control processing according to the first embodiment.

FIG. 8 is a flowchart illustrating an example of a flow of imaging control processing according to the first embodiment.

First, the imaging control unit 150 detects one or more neighboring apparatuses via the communication interface 112 (Step S100). The detection of the neighboring apparatuses is periodically performed, and a cycle thereof may be the same as or different from a movie frame cycle.

Next, the imaging control unit 150 determines whether or not to update an imaging setting (Step S110). For example, the imaging control unit 150 can determine to update the imaging setting by using an arbitrary condition, such as detection of a new neighboring apparatus, reception of an updating request from a neighboring apparatuses, elapse of a predefined period form previous updating, or temporal degradation in image quality of the infrared image, as a trigger. If updating the imaging setting is not determined, processing in Steps S115 to S150, which will be described later, is skipped.

If updating the imaging setting is determined, the imaging control unit 150 selects at least one neighboring apparatus with which competition is to be avoided on the basis of relative positional relationships between the camera module 101 and the neighboring apparatuses (Step S115). Typically, a plurality of neighboring apparatuses are selected here as targets of competition avoidance.

Next, the imaging control unit 150 selects a setting in relation to imaging that is at least partially different from a setting used by the neighboring apparatuses selected as the targets of the competition avoidance by executing setting selection processing, which will be described later (Step S120). The setting in relation to the imaging described herein includes one or more of irradiation wavelength bands of infrared rays, target wavelengths of infrared images, imaging timing of the infrared images, and irradiation intensity of the infrared rays.

Next, the imaging control unit 150 reflects the setting selected as a result of the setting selection processing to the own apparatus (Step S150). For example, the imaging control unit 150 can set a selected irradiation wavelength band and irradiation intensity for the light emitter 102 of the camera module 101. The imaging control unit 150 can set a selected target wavelength for the optical filter 104 of the camera module 101 and the image acquisition unit 120. The imaging control unit 150 can set a selected imaging timing for the camera module 101.

Next, the imaging control unit 150 determines whether the imaging timing has been reached (Step S155). If the imaging timing has been reached, the light emitter 102 of the camera module 101 emits infrared rays in the set irradiation wavelength band (Step S160) and the imaging element array 103 captures an original image (Step S170). Here, the optical filter 104 of the camera module 101 can filter infrared rays that are incident on the imaging element array 103 so that only infrared rays in the set target wavelength pass therethrough.

Next, the image acquisition unit 120 acquires an infrared image with the set target wavelength through preliminary processing, such as amplification of image signals, demosaicing, noise removal, and separation of wavelength components, as needed (Step S180). Then, the image acquisition unit 120 outputs the acquired infrared image to the application unit 130 (Step S190). The infrared image output here is displayed by the application unit 130 on a screen and is input to an application function such as a drive assist function or is encoded and stored. Thereafter, the flow returns to Step S100, and the aforementioned processing is repeated.

(2-1) Setting Selection Processing-First Example

Figure 9A:
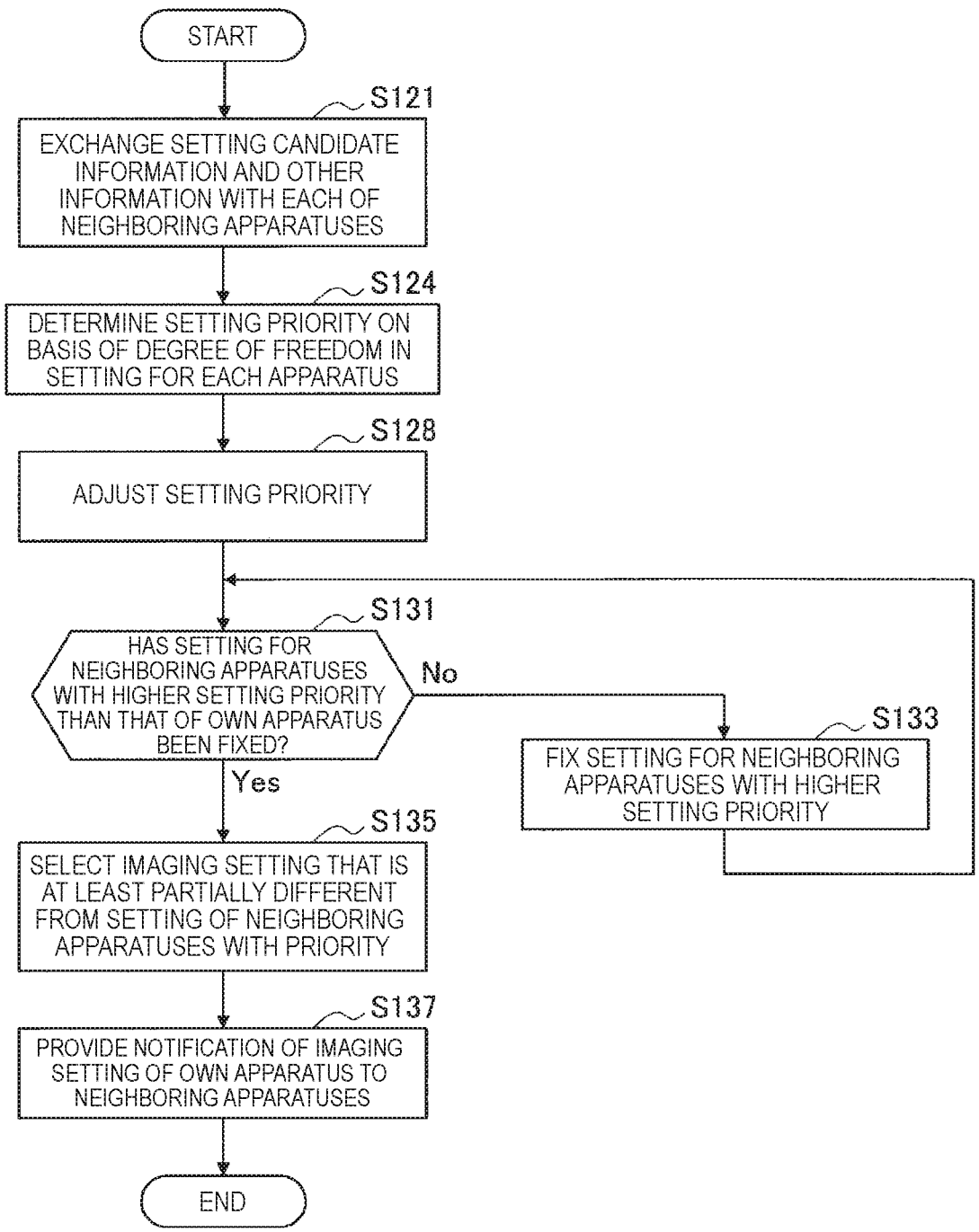
FIG. 9A is a flowchart illustrating a first example of a flow of a setting selection processing shown in FIG. 8.

FIG. 9A is a flowchart showing a first example of a flow of the setting selection processing shown in Step S120 in FIG. 8.

Referring to FIG. 9A, the imaging control unit 150 first exchanges setting candidate information and other information with each neighboring apparatuses (Step S121). Next, the imaging control unit 150 determines a degree of freedom in setting for each of the apparatuses from setting candidate information of the own apparatus and the neighboring apparatuses and determines a setting priority for each of the apparatuses on the basis of the determined degree of freedom in setting (Step S124). Next, the imaging control unit 150 adjusts the setting priority for apparatuses with the same degree of freedom in setting by using information other than the setting candidate information (S128).

Next, the imaging control unit 150 determines whether a setting of all neighboring apparatuses with higher setting priority than that of the own apparatus has been fixed (Step S131). If neighboring apparatuses with higher setting priority for which the setting has not been fixed remain, the imaging control unit 150 fixes the setting of the neighboring apparatuses (Step S133). For an apparatus for which only one wavelength of an infrared ray that can be selected remains, for example, the one wavelength can be selected as the target wavelength of the apparatus. The imaging control unit 150 may receive notification messages for providing a notification of the imaging setting for the neighboring apparatuses from the neighboring apparatuses or may transmit an indication message that indicates that the apparatus will use a specific imaging setting to the neighboring apparatuses via the communication interface 112. If the setting of all of the neighboring apparatuses with higher setting priority than that of the own apparatus is fixed, the imaging control unit 150 selects an imaging setting that is at least partially different from the setting for the own apparatus (Step S135). Then, the imaging control unit 150 transmits a notification message for providing a notification of the imaging setting selected for the own apparatus to the neighboring apparatuses via the communication interface 112 (Step S137).

(2-2) Setting Selection Processing-Second Example

Figure 9B:
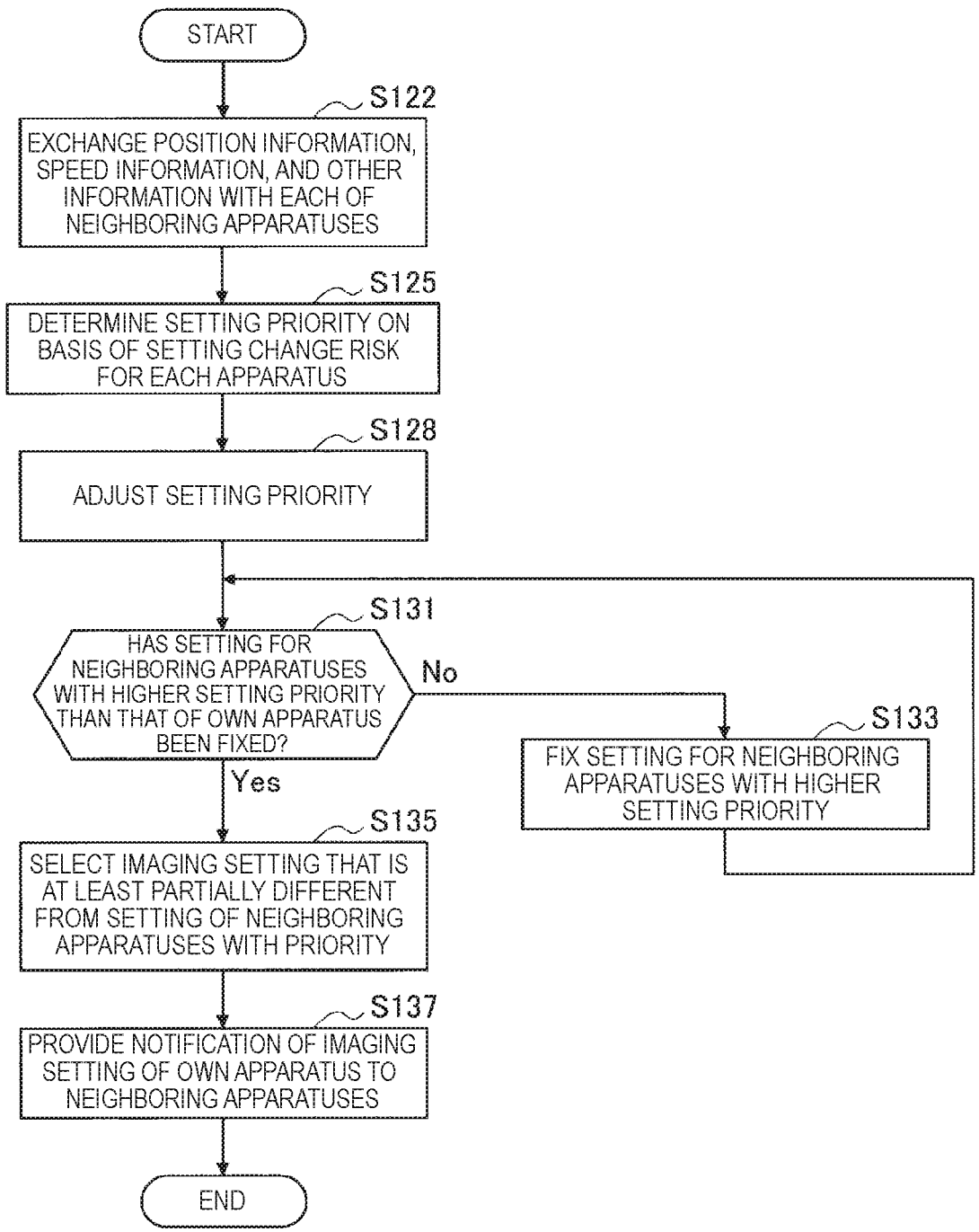
FIG. 9B is a flowchart illustrating a second example of a flow of a setting selection processing shown in FIG. 8.

FIG. 9B is a flowchart showing a second example of a flow of the setting selection processing shown in Step S120 in FIG. 8.

Referring to FIG. 9B, the imaging control unit 150 first exchanges position information, speed information, and other information with each neighboring apparatus (Step S122). Next, the imaging control unit 150 determines a setting change risk for each of the apparatuses from positions and speeds of the own apparatus and the neighboring apparatuses and determines a setting priority for each of the apparatuses on the basis of the determined setting change risk (Step S125). Next, the imaging control unit 150 adjusts a setting priority for apparatuses with the same setting change risk by using criteria other than the setting change risk (Step S128).

Subsequent processing in Steps S131 to S137 may be basically the same as the processing described above with reference to FIG. 9A. If the same setting as a current setting is not used by apparatuses with a higher setting priority, it is desirable for each of the apparatuses to select not to change the current setting in Steps S133 and S135. This makes it possible to prevent turbulence in an infrared image due to a change in the setting in advance.

(2-3) Setting Selection Processing-Third Example

Figure 9C:
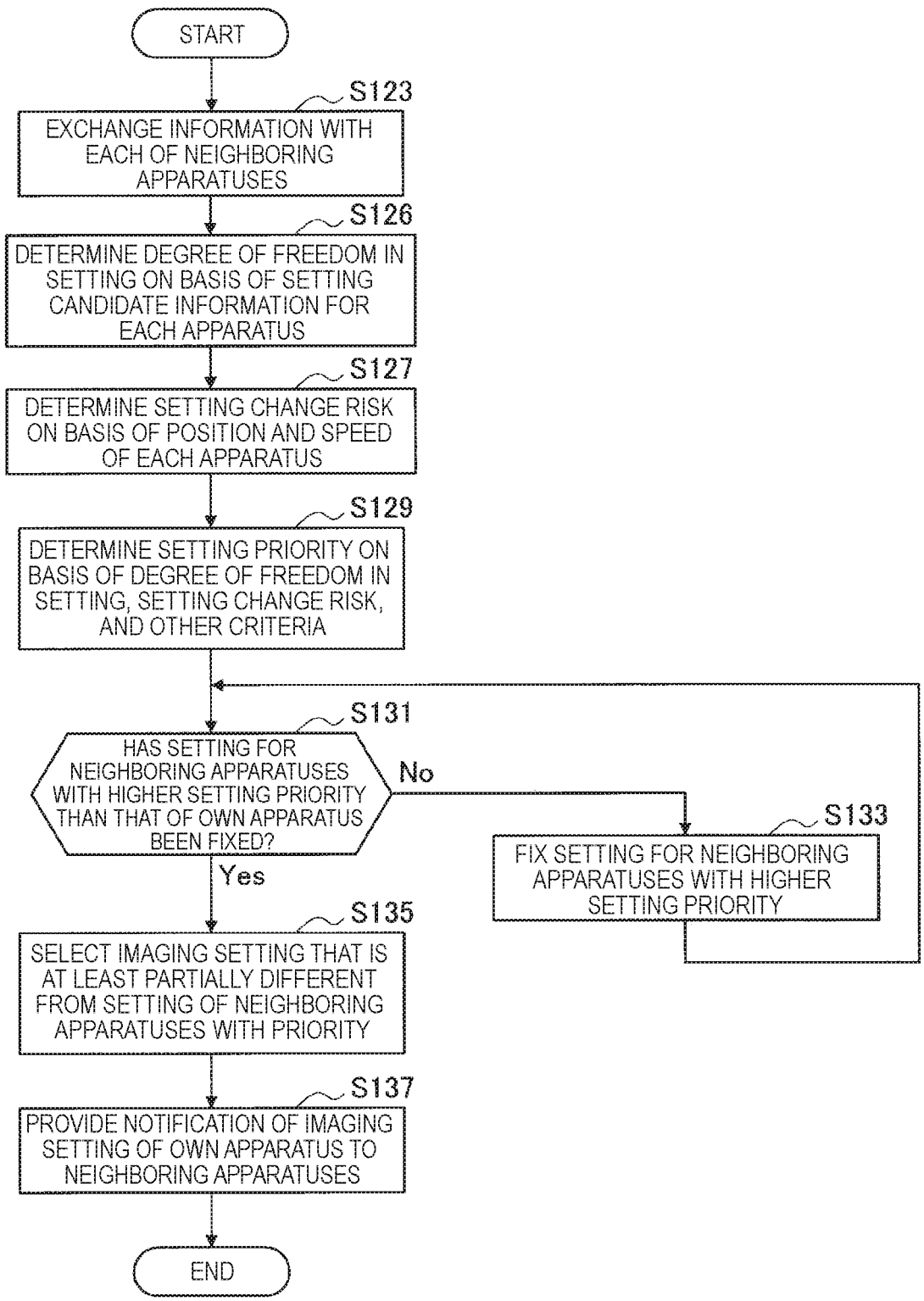
FIG. 9C is a flowchart illustrating a third example of a flow of a setting selection processing shown in FIG. 8.

FIG. 9C is a flowchart showing a third example of a flow of the setting selection processing shown in Step S120 in FIG. 8.

Referring to FIG. 9C, the imaging control unit 150 first exchanges setting candidate information, position information, speed information, and other information with each neighboring apparatus (Step S123). Next, the imaging control unit 150 determines a degree of freedom in setting for each of the apparatuses from setting candidate information of the own apparatus and the neighboring apparatuses (Step S126). The imaging control unit 150 determines a setting change risk for each of the apparatuses from positions and speeds of the own apparatus and the neighboring apparatuses (Step S127). Then, the imaging control unit 150 determines a setting priority for each of the apparatuses on the basis of degrees of freedom in setting, setting change risks, and other criteria (Step S129). Since subsequent processing in Steps S131 to S137 is the same as the processing described above with reference to FIG. 9A, repetition of the description will be omitted herein.

Note that the setting priority may be determined by using different criteria depending on a purpose of the apparatus. For example, dynamic switching of criteria may be realized, and for example, the setting change risks are mainly used if the imaging control apparatus 100 controls an in-vehicle camera, and the degrees of freedom in setting are mainly used if the imaging control apparatus 100 controls a camera of a mobile device such as a smart phone.

3. Second Embodiment

In the previous section, an example in which the imaging control apparatus 100 installed in a certain vehicle performs inter-vehicle communication with the imaging control apparatus 100 installed in another vehicle and image capturing competition is avoided on the basis of the information exchanged therebetween was described as the first embodiment. In contrast, a management server that unitarily manages a setting in relation to image capturing for generating infrared images by a plurality of apparatuses is introduced in a second embodiment described in this section.

[3-1. System Configuration]

Figure 10:
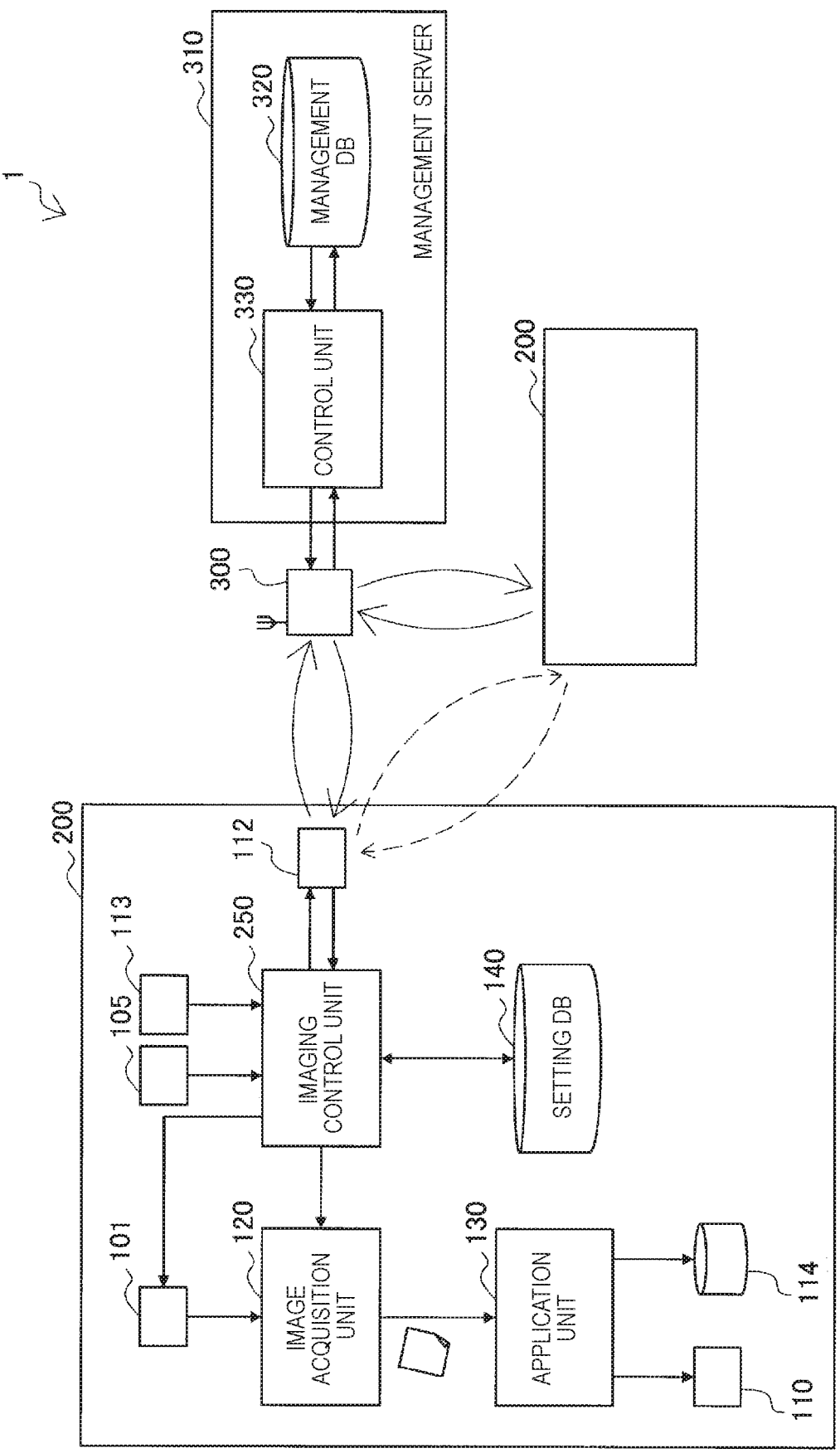
FIG. 10 is an explanatory diagram illustrating an example of a functional configuration of an imaging control system according to a second embodiment.

FIG. 10 is an explanatory diagram illustrating an example of a functional configuration of an imaging control system according to the second embodiment. Referring to FIG. 10, an imaging control system 1 includes a plurality of imaging control apparatuses 200, an access point 300, and a management server 310. The imaging control apparatuses 200 communicate with the management server 310 via communication interfaces 112 and the access point 300. The access point 300 may be a relay apparatus installed on the road side. Such communication between the in-vehicle apparatuses and the road side apparatus (and the following server) will be referred to as between-road-and-vehicle communication or roadside unit-to-vehicle (R2V) communication. Additionally, the imaging control apparatus 200 may execute inter-vehicle communication with other imaging control apparatuses 200 via the communication interfaces 112. Although only two imaging control apparatuses 200 are shown in FIG. 10, the imaging control system 1 may include more imaging control apparatuses 200 in practice in the embodiment.

[3-2. Functions on Apparatus Side]

A hardware configuration of each of the imaging control apparatuses 200 according to the second embodiment may be the same as the hardware configuration of the imaging control apparatus 100 described above with reference to FIG. 3. Each of the imaging control apparatuses 200 is provided with an image acquisition unit 120, an application unit 130, a setting DB 140, and an imaging control unit 250.

The imaging control unit 250 controls a setting for generation of an infrared image on the basis of a control parameter transmitted and received to and from the management server 310 via the communication interface 112. In the embodiment, any of the wavelength separation type control, the time separation type control, and a combination of the wavelength separation type control and the time separation type control described in the previous section may also be performed. However, a setting to be used in each apparatus is determined by the management server 310. Then, the imaging control unit 250 selects a setting specified by the control parameter received from the management server 310 for generation of an infrared image by the own apparatus.

If the management server 310 that has authority for a geographical region in which the own apparatus is positioned is detected, for example, the imaging control unit 250 transmits a setting request message for requesting an assignment of a setting that does not compete with other apparatuses to the management server 310 via the communication interface 112. The setting request message can include, for example, an identifier of the imaging control apparatus 200, setting candidate information, current setting information, position information, and speed information. The setting candidate information indicates one or more setting candidates for generation of an infrared image by the imaging control apparatus 200. If the setting request message is received from the imaging control apparatus 200, the management server 310 assigns a setting that does not compete with setting assigned to neighboring apparatuses positioned in the vicinity of the imaging control apparatus 200 (for example, a setting in which a combination of a target wavelength and imaging timing is at least partially different) to the imaging control apparatus 200. The imaging control unit 250 receives a response message or a setting update message for specifying the setting assigned to the imaging control apparatus 200 from the management server 310 via the communication interface 112. Then, the imaging control unit 250 reflects a setting specified by a control parameter included in the received message (one or more of irradiation wavelength bands of infrared rays, a target wavelength of the infrared image, imaging timing of the infrared image, and irradiation intensity of the infrared rays) on the camera module 101 and the image acquisition unit 120.

[3-3. Functions on Server Side]

As shown in FIG. 10, the management server 310 is provided with a management database (DB) 320 and a control unit 330. The management DB 320 stores an identifier of the apparatus, setting candidates that can be selected, a current setting, a position, and a speed of each of the plurality of imaging control apparatuses 200 being managed by the management server 310. The control unit 330 updates the information in the management DB 320 with the latest information reported from each of the imaging control apparatuses 200.

If the aforementioned setting request message is received from the imaging control apparatus 200, the control unit 330 selects all other apparatuses being managed, other apparatuses in a specific region in which the imaging control apparatus 200 is positioned, or a plurality of neighboring apparatuses selected by the method described above with reference to FIG. 7 as targets of competition avoidance. The control unit 330 identifies a setting that is currently being used by the selected existing apparatuses with reference to the management DB 320. Then, the control unit 330 assigns a setting that is at least partially different from the setting that is used by the existing apparatuses from among the setting candidates that can be selected by the imaging control apparatus 200 to the imaging control apparatus 200. In one example in which the vehicles V11, V12, V13 and V14 respectively use the target wavelengths r2, r4, r8, and r6, as shown in FIG. 6A, the control unit 330 can assign, for example, the wavelength r3 as the target wavelength for a different apparatus that has requested an assignment of a setting. An unused time slot may be assigned instead of an unused wavelength as in the example in FIG. 6B or FIG. 6C.

The control unit 330 may assign a setting that is determined to be unused to a new apparatus without changing settings that are being used by the existing apparatuses. In such a case, the control unit 330 transmits a response message including a control parameter that specifies the setting assigned to the imaging control apparatus 200 to the imaging control apparatus 200 as a response to the setting request message from the imaging control apparatus 200. Instead, the control unit 330 may execute the setting selection processing described above with reference to FIGS. 9A to 9C on a group including the existing apparatuses and the new apparatus as a target and select/reselect a setting for each of the apparatuses in order of a setting priority. In such a case, the control unit 330 transmits a setting updating message indicating an update of the setting to existing apparatuses for which the setting is to be updated and transmits the aforementioned response message to the new apparatus. The setting request message transmitted from the imaging control apparatus 200 may indicate a desired setting that the imaging control apparatus 200 desires to use. In such a case, the management server 310 can provide a notification of whether or not to permit use of the desired setting, and when the use of the desired setting is not permitted, provide a setting that is alternatively assigned in the response message to the apparatus that has issued the request.

In an example, the control unit 330 may predefine a setting that can be assigned to a plurality of apparatuses in an overlapped manner (a specific target wavelength, an imaging timing, or a combination thereof) when not able to completely avoid competition due to a large number of apparatuses (hereinafter, referred to as a prescribed setting). In the example, if the control unit 330 determines that image capturing competition cannot be avoided completely by the wavelength, time, or space separation, then the control unit 330 assigns the aforementioned prescribed setting to one or more apparatuses (for example, apparatuses with a relatively lower setting priority). For example, since assigning no setting to the apparatus (causing the apparatus not to capture image) that has requested the assignment of the setting should be avoided in terms of safety for the purpose of a drive assist, it is advantageous to permit use of such a prescribed setting in an overlapped manner. The prescribed setting may be used by the imaging control apparatus 200 in a period until a setting is assigned by the management server 310.

[3-4. Flow of Processing]

(1) Processing on Apparatus Side

Figure 11:
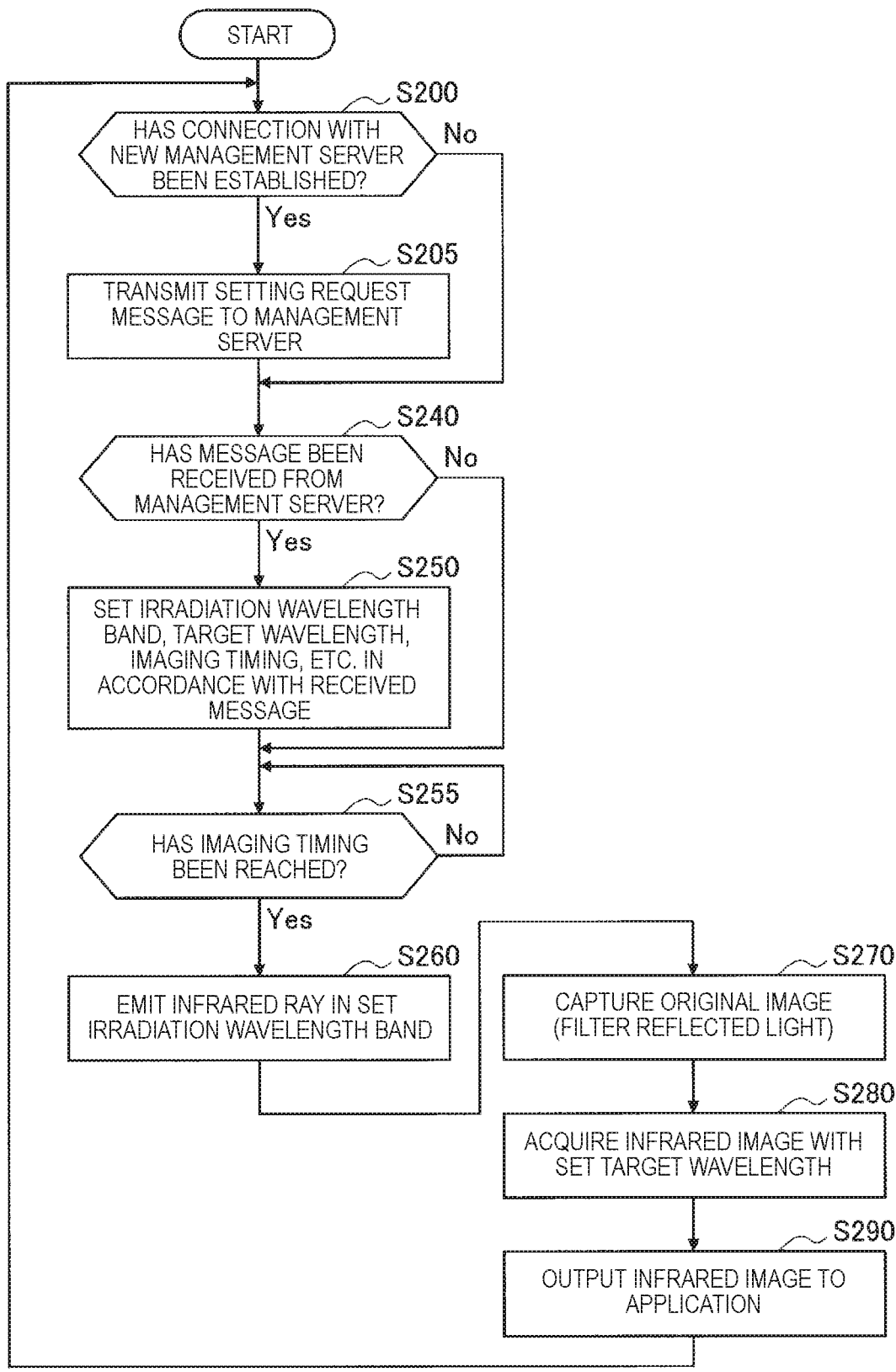
FIG. 11 is a flowchart showing an example of a flow of imaging control processing on an apparatus side according to the second embodiment.

FIG. 11 is a flowchart showing an example of a flow of an imaging control processing on the apparatus side according to the second embodiment.

First, the imaging control unit 250 of the imaging control apparatus 200 attempts to establish a connection to the new management server 310 periodically or when a connection with a management server that is connected to been lost (for example, due to a movement to outside a management region) (Step S200). Then, if the communication interface 112 establishes a connection to the management server 310, the imaging control unit 250 transmits a setting request message that can include an identifier of the imaging control apparatus 200, setting candidate information, current setting information, position information, and speed information to the management server 310 (Step S205). While the connection to the management server 310 is maintained or while a setting that has already been assigned is effective, the processing in Steps S200 and S205 may be skipped.

The imaging control unit 250 waits for reception of a message from the management server 310 (Step S240). Then, if the imaging control unit 250 receives a response message in response to the setting request message or the setting updating message from the management server 310, the imaging control unit 250 sets one or more of an irradiation wavelength band of infrared rays, a target wavelength of an infrared image, an imaging timing of an infrared image, and an irradiation intensity of infrared rays for the camera module 101 and the image acquisition unit 120 in accordance with the received message (Step S250).

Next, the imaging control unit 250 determines whether the imaging timing has been reached (Step S255). If the imaging timing has been reached, the light emitter 102 of the camera module 101 emits infrared rays in the set irradiation wavelength bands (Step S260), and the imaging element array 103 captures an original image (Step S270). Here, the optical filter 104 of the camera module 101 can filter infrared rays that are incident on the imaging element array 103 so that only infrared rays with the set target wavelengths are caused to pass.

Next, the image acquisition unit 120 acquires an infrared image with the set target wavelength through preliminary processing, such as amplification of image signals, demosaicing, noise removal, and separation of wavelength components, as needed (Step S280). Then, the image acquisition unit 120 outputs the acquired infrared image to the application unit 130 (Step S290). Thereafter, the flow returns to Step S200, and the aforementioned processing is repeated.

(2-1) Processing on Server Side-First Example

Figure 12A:
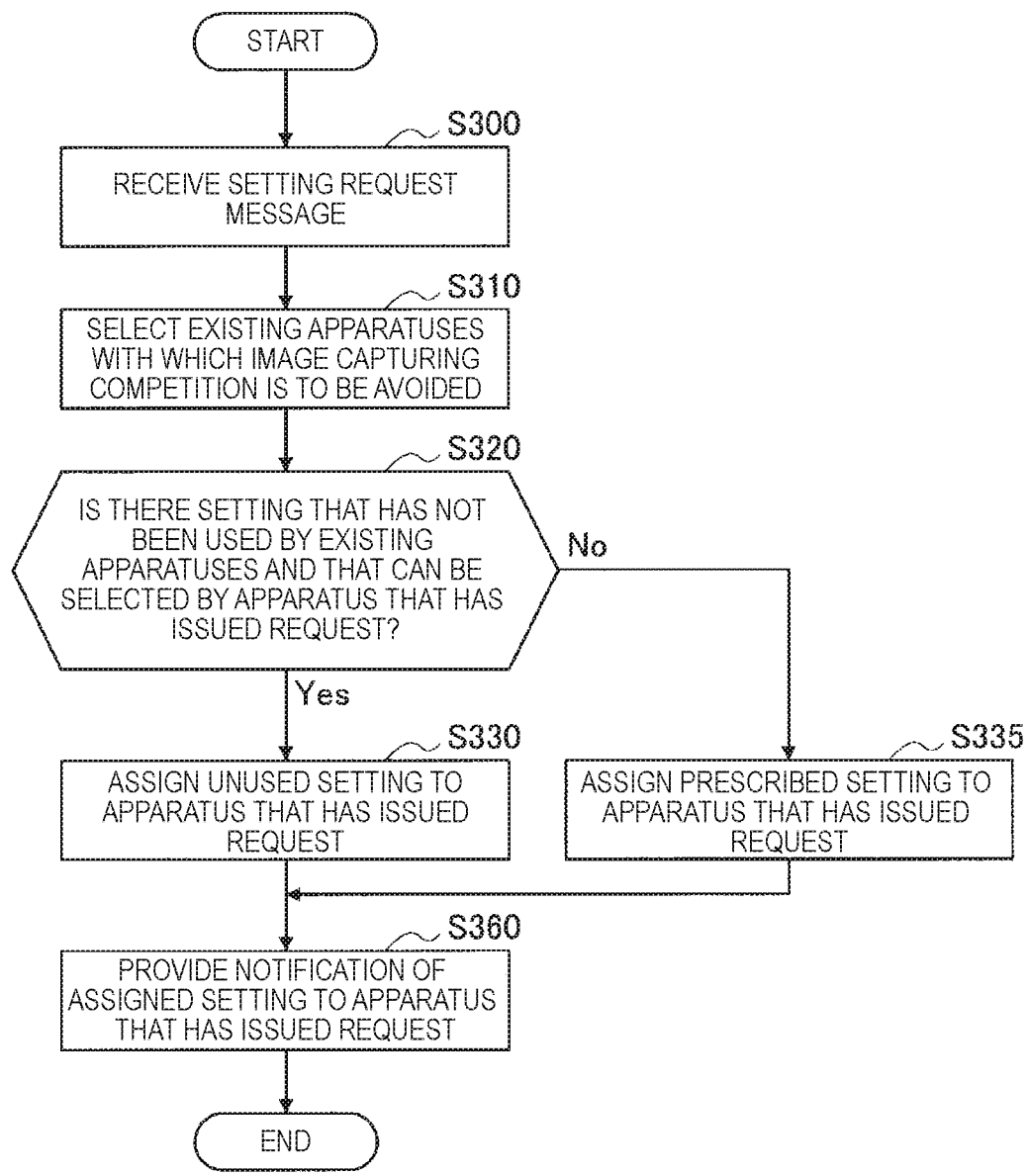
FIG. 12A is a flowchart showing a first example of a flow of imaging control processing on a server side according to the second embodiment.

FIG. 12A is a flowchart showing a first example of a flow of the imaging control processing on the side of the server according to the second embodiment.

The imaging control processing shown in FIG. 12A is started by using a reception of the setting request message from the imaging control apparatus 200 by the management server 310 as a trigger (Step S300). The control unit 330 of the management server 310 selects existing apparatuses with which image capturing competition with the apparatus that has issued the request is to be avoided as targets of the competition avoidance in response to the reception of the setting request message (Step S310).

Next, the control unit 330 determines whether or not there is a setting that has not been used by the selected existing apparatuses and that can be used by the apparatus that has issued the request with reference to the management DB 320 (Step S320). If there is an unused setting that can be selected, the control unit 330 assigns the setting to the apparatus that has issued the request (Step S330). If there is no unused setting that can be selected, the control unit 330 assigns the prescribed setting to the apparatus that has issued the request (Step S335).

Then, the control unit 330 transmits a response message including a control parameter for specifying the setting to the apparatus that has issued the request in order to provide a notification of the setting assigned to the apparatus that has issued the request (Step S360).

(2-2) Processing on Server Side-Second Example

Figure 12B:
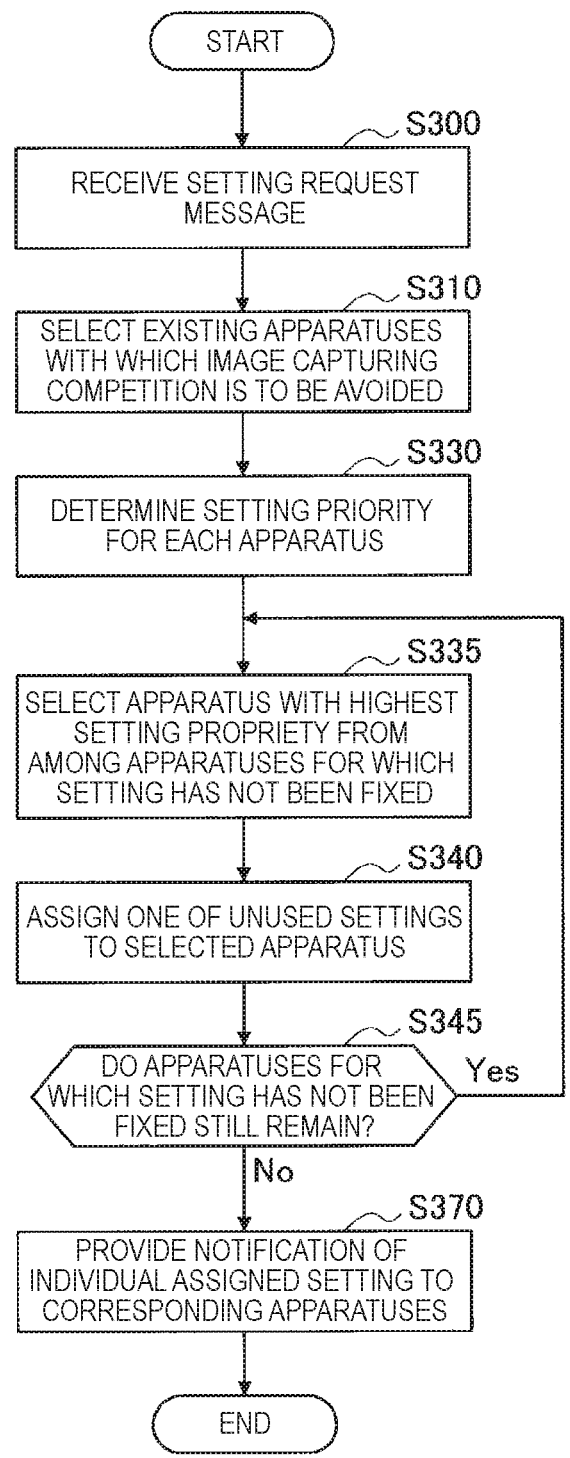
FIG. 12B is a flowchart showing a second example of a flow of imaging control processing on a server side according to the second embodiment.

FIG. 12B is a flowchart showing a second example of a flow of the imaging control processing on the side of the server according to the second embodiment.

The imaging control processing shown in FIG. 12B is also started by using a reception of a setting request message from the imaging control apparatus 200 by the management server 310 as a trigger (Step S300). The control unit 330 of the management server 310 selects existing apparatuses with which image capturing competition with an apparatus that has issued the request is to be avoided as targets of competition avoidance in response to the setting request message (Step S310).

Next, the control unit 330 determines a setting priority for each of the apparatus that has issued the request and the existing apparatuses selected in Step S310 on the basis of information on setting candidates that can be selected, a current setting, a position, and a speed (on the basis of criteria such as a degree of freedom in setting and a setting change risk) (Step S330).

Then, the control unit 330 selects an apparatus with the highest setting priority from among apparatuses for which a setting has not been fixed (Step S335). Then, the control unit 330 assigns one of unused settings to the selected apparatus (Step S340). The control unit 330 repeats such setting assignment in the order from the apparatus with the highest setting priority until a setting is assigned to all of the apparatuses (Step S345).

Then, the control unit 330 transmits a response message or a setting updating message that includes a control parameter for specifying an individual setting in order to provide a notification of the individual assigned setting to the apparatus that has issued the request and an apparatuses for which the setting is to be updated (Step S370).

[3-5. Application Examples]

The system configuration in which the management server is interposed as illustrated in FIG. 10 may be utilized to assist imaging control performed mainly by apparatuses (rather than a server) as described in the first embodiment. For example, the management server 310 may manage current positions and speeds of individual apparatuses and execute a selection of neighboring apparatuses (Step S115) in the imaging control processing described above with reference to FIG. 8 instead of the imaging control apparatus 100. The management server 310 may provide map information (for example, information indicating locations with high accident occurrence rates) that can be utilized for evaluating a setting change risk for each apparatus to the imaging control apparatus 100. The configuration is not limited to these examples, and an arbitrary part of the processing described in relation to the first embodiment may be executed by the management server 310 instead of the imaging control apparatus 100.

4. Conclusion

The various embodiments of the technology according to the present disclosure have been described in detail with reference to FIGS. 1 to 12B. According to the aforementioned embodiments, a setting for generation of an infrared image is controlled on the basis of a control parameter transmitted to another apparatus or received from another apparatus via a communication interface in an apparatus that acquires an infrared image generated by an infrared camera imaging reflected light of emitted infrared rays. Therefore, it is possible to dynamically adjust the setting in relation to image capturing used by each of apparatuses that are positioned near each other through an information exchange such that image capturing competition is avoided. In this manner, it is possible to avoid degradation of image quality of the individual infrared images due to light emitted from other cameras as a disturbance in a scene in which a large number of infrared cameras capture images.

According to the example in which the setting in relation to image capturing is adjusted so that irradiation wavelength bands of infrared rays and target wavelengths of infrared images are different among apparatuses, it is possible to significantly avoid image capturing competition by a large number of apparatuses in comparison to an existing method by which a degree of separation among only two to three apparatuses can be achieved. For example, it is assumed that a first apparatus acquires an infrared image by using a first wavelength that belongs to a first irradiation wavelength band as a target wavelength, and that a second apparatus (a neighboring apparatus of the first apparatus) acquires an infrared image by using a second wavelength that belongs to a second irradiation wavelength band as a target wavelength. The first apparatus selects the first wavelength so that an influence of light emitted from the second apparatus in the second irradiation wavelength band on the infrared image is reduced. For example, the infrared image generated by using the first wavelength which is the target wavelength is not influenced by the light emitted from the second apparatus by selecting the first wavelength to not be included in the second irradiation wavelength band. Also, the first apparatus selects the first irradiation wavelength band so that an influence of the light from the first apparatus in the first irradiation wavelength band on the infrared image generated by the second apparatus is reduced. For example, the infrared image generated by using the second wavelength which is the target wavelength is not influenced by the light emitted from the first apparatus by selecting the first irradiation wavelength so as not to include the second wavelength.

Even in an example in which the setting in relation to image capturing is adjusted so that imaging timing of infrared images is different among apparatuses, a higher degree of separation than that of the existing method can be achieved. If, for example, the first apparatus generates the infrared image by imaging the reflected light of the infrared rays at a first imaging timing, the first imaging timing is selected so that the first imaging timing does not interfere a second imaging timing selected by the second apparatus (a neighboring apparatus of the first apparatus). In such a case, since an emission of infrared rays from one apparatus and imaging by the other apparatus are not performed at the same time, it is possible for both the apparatuses to acquire appropriate infrared images.

Further, according to the aforementioned embodiments, an apparatus to which a relatively high setting priority is given transmits a control parameter via a communication interface to cause neighboring apparatuses with lower setting priorities to use a setting that is at least partially different from a setting used by the apparatus itself. The apparatuses to which the relatively lower setting priority is given selects a setting that is at least partially different from the setting specified by the control parameter received from the neighboring apparatus for generation of the infrared image. It is possible to avoid a situation in which a plurality of apparatuses disorderly use overlapped settings by determining a setting to be used by each apparatus in such an order of priority.

According to an example, a setting priority is determined on the basis of degrees of freedom in setting for individual apparatuses. For example, it is possible to reduce the possibility that apparatuses with which competition cannot be avoided are left by selecting a setting for apparatuses with lower degrees of freedom in setting (apparatuses for which selection can be made from less types of setting) with priority. According to another example, a setting priority is determined on the basis of a setting change risks depending on moving speeds or positions of the individual apparatuses. For the purpose of in-vehicle apparatuses, for example, it is possible to prevent an increase in risks of accidents caused by temporal turbulence in infrared images by selecting a setting for apparatuses with higher setting change risks with priority.

Further, according to the aforementioned embodiments, a group of neighboring apparatuses with which competition is to be avoided is selected on the basis of relative positional relationships with one or more neighboring apparatuses detected via a communication interface, and a setting for generation of infrared images is controlled such that a at least partially different setting is used among the neighboring apparatuses in the selected group. Therefore, it is possible to perform adjustment for avoiding competition not necessarily among all of the apparatuses but among fewer apparatuses that are present at positions at which the apparatuses have influences on each other in a scene in which a large number of apparatuses capture images. Accordingly, it is possible to effectively avoid image capturing competition while suppressing communication overhead and processing for avoiding the competition to an appropriate level.

Further, according to a certain embodiment, a management server that manages a setting for generation of infrared images by a plurality of apparatuses is introduced, and each of the apparatuses selects a setting specified by control parameters received from the management server for the generation of the infrared image. Therefore, each of the apparatuses can put processing required for, for example, avoiding competition, such as a selection of a neighboring apparatuses and determination of a priority to the management server. Also, since the management server can adjust the setting in relation to image capturing for two or more apparatuses that cannot directly communicate with each other, it is possible to enhance reliability of competition avoidance in comparison to a system formed with no management server.

Note that the series of control processes carried out by each apparatus described in the present specification may be realized by software, hardware, or a combination of software and hardware. Programs that compose such software may be stored in advance for example on a storage medium (non-transitory medium) provided inside or outside each of the apparatus. As one example, during execution by a computer, such programs are written into RAM (Random Access Memory) and executed by a processor such as a CPU.

Note that it is not necessary for the processing described in this specification with reference to the flowchart to be executed in the order shown in the flowchart. Some processing steps may be performed in parallel. Further, some of additional steps can be adopted, or some processing steps can be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An imaging control apparatus including:
an image acquisition unit that acquires an infrared image generated by an infrared camera imaging reflected light of emitted infrared rays; and
a control unit that controls a setting for the generation of the infrared image on the basis of a control parameter transmitted to another apparatus or received from another apparatus via a communication interface.

(2)

The imaging control apparatus according to (1),
in which the setting controlled by the control unit includes one or more of an irradiation wavelength band of the infrared rays, a target wavelength of the infrared image, and an imaging timing of the infrared image.

(3)

The imaging control apparatus according to (2),
in which the image acquisition unit acquires the infrared image generated using a first wavelength that belongs to a first irradiation wavelength band as the target wavelength, and
the control unit selects the first wavelength on the basis of the control parameter so that an influence of a second irradiation wavelength band selected by a neighboring apparatus on the infrared image acquired by the image acquisition unit is reduced.

(4)

The imaging control apparatus according to (3),
in which the neighboring apparatus generates an infrared image using a second wavelength that belongs to the second irradiation wavelength band as a target wavelength, and
the control unit selects the first irradiation wavelength band on the basis of the control parameter so that an influence of the first irradiation wavelength band on the infrared image generated by the neighboring apparatus is reduced.

(5)

The imaging control apparatus according to (2),
in which the infrared image is generated by imaging the reflected light at a first imaging timing, and
the control unit selects the first imaging timing on the basis of the control parameter so that the first imaging timing does not interfere with a second imaging timing selected by a neighboring apparatus.

(6)

The imaging control apparatus according to (2),
in which the control parameter specifies a first setting for the infrared image acquired by the image acquisition unit, and
the control unit transmits the control parameter via the communication interface in order to cause a neighboring apparatus with a lower setting priority to use a second setting that is at least partially different from the first setting.

(7)

The imaging control apparatus according to (2),
in which the control parameter specifies a second setting for an infrared image generated by a neighboring apparatus with a higher setting priority, and
the control unit selects, for generation of the infrared image acquired by the image acquisition unit, a first setting that is at least partially different from the second setting specified by the control parameter received via the communication interface.

(8)

The imaging control apparatus according to (6) or (7),
in which the setting priority is determined on the basis of a degree of freedom in setting for individual apparatuses.

(9)

The imaging control apparatus according to any one of (6) to (8),
in which the setting priority is determined on the basis of a setting change risk that depends on a moving speed or a position of individual apparatuses.

(10)

The imaging control apparatus according to any one of (1) to (9),
in which the control unit
detects one or more neighboring apparatuses via the communication interface,
selects at least one neighboring apparatus with which competition is to be avoided on the basis of a relative positional relationship between the infrared camera and the detected one or more neighboring apparatuses, and
controls a setting for the generation of the infrared image so that the setting that is at least partially different from a setting for the at least one selected neighboring apparatus is used.

(11)

The imaging control apparatus according to (1) or (2),
in which the communication interface communicates with a management server that manages settings for generation of infrared images by a plurality of apparatuses, and
the control unit selects, for generation of the infrared image acquired by the image acquisition unit, a setting that is specified by a control parameter received from the management server via the communication interface.

(12)

The imaging control apparatus according to (11),
in which the control unit transmits setting candidate information indicating one or more setting candidates that are selectable for the generation of the infrared image to the management server via the communication interface, and
the control parameter specifies a setting included in the one or more setting candidates indicated by the setting candidate information.

(13)

The imaging control apparatus according to (1),
in which the infrared image is generated by imaging the reflected light of the infrared ray emitted with a first irradiation intensity, and
the control unit selects the first irradiation intensity on the basis of the control parameter so that an influence of irradiation with the infrared ray with the first irradiation intensity on an infrared image generated by a neighboring apparatus is reduced.

(14)

The imaging control apparatus according to (1),
in which the infrared image is generated by imaging the reflected light of the infrared ray in a first polarization direction, and
the control unit selects the first polarization direction on the basis of the control parameter so that the first polarization direction does not overlap with a second polarization direction selected by a neighboring apparatus.

(15)

The imaging control apparatus according to any one of (1) to (14), further including:
the infrared camera that includes a light emitter that emits the infrared rays and an imaging element array that images the reflected light.

(16)
An imaging control method including:
acquiring an infrared image that is generated by an infrared camera imaging reflected light of emitted infrared rays; and
controlling a setting for the generation of the infrared image on the basis of a control parameter transmitted to another apparatus or received from another apparatus via a communication interface.

(17)
A program that causes a computer to function as:
an image acquisition unit that acquires an infrared image generated by an infrared camera imaging reflected light of emitted infrared rays; and
a control unit that controls a setting for the generation of the infrared image on the basis of a control parameter transmitted to another apparatus or received from another apparatus via a communication interface.

REFERENCE SIGNS LIST 1 imaging control system
100, 200 imaging control apparatus
101 camera module (infrared camera)
120 image acquisition unit
130 application unit
140 setting DB
150, 250 imaging control unit
310 management server

The invention claimed is:

1. An imaging control apparatus, comprising:
a processor configured to:
acquire a first infrared image generated by an infrared camera that captures reflected light of infrared rays;
control a first setting for the generation of the first infrared image based on a control parameter, wherein the first setting includes at least one of an irradiation wavelength band of the infrared rays, a target wavelength of the first infrared image, or an imaging timing of the first infrared image; and
transmit the control parameter to a neighboring apparatus via a communication interface, wherein
the control parameter causes the neighboring apparatus to use a second setting that is at least partially different from the first setting,
a setting priority of the neighboring apparatus is lower than a setting priority of the imaging control apparatus, and
the setting priority of the neightboring apparatus is based on a degree of freedom in setting for the imaging control apparatus and the neighboring apparatus.

2. The imaging control apparatus according to claim 1, wherein the processor is further configured to:
acquire the first infrared image generated using a first wavelength that belongs to a first irradiation wavelength band as the target wavelength, and
select the first wavelength based on the control parameter such that an influence of a second irradiation wavelength band selected by the neighboring apparatus on the first infrared image is reduced.

3. The imaging control apparatus according to claim 2, wherein
the neighboring apparatus generates a second infrared image based on a second wavelength that belongs to the second irradiation wavelength band as the target wavelength, and
the processor is further configured to select the first irradiation wavelength band based on the control parameter such that an influence of the first irradiation wavelength band on the second infrared image is reduced.

4. The imaging control apparatus according to claim 1, wherein
the first infrared image is generated based on the reflected light at a first imaging timing,
the processor is further configured to select the first imaging timing based on the control parameter such that the first imaging timing does not interfere with a second imaging timing, and
the second imaging timing is selected by the neighboring apparatus.

5. The imaging control apparatus according to claim 1, wherein
the control parameter specifies the second setting for a second infrared image,
the second infrared image is generated by the neighboring apparatus,
the neighboring apparatus has the setting priority different from the setting priority of the imaging control apparatus, and
the processor is further configured to select, for generation of the first infrared image, the first setting that is at least partially different from the second setting specified by the control parameter.

6. The imaging control apparatus according to claim 1, wherein the setting priority of the neighboring apparatus is determined based on a setting change risk that depends on one of a moving speed or a position of the imaging control apparatus and the neighboring apparatus.

7. The imaging control apparatus according to claim 1, wherein the processor is further configured to:
detect the neighboring apparatus via the communication interface;
select the neighboring apparatus based on a relative positional relationship between the infrared camera and the detected neighboring apparatus; and
control the first setting for the generation of the first infrared image such that the first setting is at least partially different from the second setting for the selected neighboring apparatus.

8. The imaging control apparatus according to claim 1, wherein
the communication interface communicates with a management server,
the management server manages a plurality of settings for the generation of a plurality of infrared images by a plurality of apparatuses, and
the processor is further configured to:
receive the control parameter from the management server via the communication interface, wherein the control parameter includes the second setting, and
select, for the generation of the first infrared image, the second setting.

9. The imaging control apparatus according to claim 8, wherein the processor is further configured to transmit setting candidate information the management server via the communication interface, wherein
the setting candidate information indicates at least one setting candidate,
the at least one setting candidate is selectable for the generation of the first infrared image, and the control parameter indicates the second setting included in the at least one setting candidate.

10. The imaging control apparatus according to claim 1, wherein
the first infrared image is generated based on the reflected light of the infrared rays emitted with a first irradiation intensity,
the processor is further configured to select the first irradiation intensity based on the control parameter such that an influence of irradiation with the infrared rays with the first irradiation intensity on a second infrared image is reduced, and
the second infrared image is generated by the neighboring apparatus.

11. The imaging control apparatus according to claim 1, wherein
the first infrared image is generated based on the reflected light of the infrared rays in a first polarization direction,
the processor is further configured to select the first polarization direction based on the control parameter such that the first polarization direction does not overlap with a second polarization direction, and
the second polarization direction is selected by the neighboring apparatus.

12. The imaging control apparatus according to claim 1, wherein the infrared camera includes:
a light emitter configured to emit the infrared rays; and
an imaging element array configured to capture the reflected light.

13. An imaging control method, comprising:
in an imaging control apparatus:
acquiring an infrared image generated by an infrared camera that captures reflected light of infrared rays;
controlling a first setting for the generation of the infrared image based on a control parameter, wherein
the first setting includes at least one of an irradiation wavelength band of the infrared rays, a target wavelength of the infrared image, or an imaging timing of the infrared image; and
transmitting the control parameter to a neighboring apparatus via a communication interface, wherein
the control parameter causes the neighboring apparatus to use a second setting that is at least partially different from the first setting,
a setting priority of the neighboring apparatus is lower than a setting priority of the imaging control apparatus, and
the setting priority of the neighboring apparatus is based on a degree of freedom in setting for the imaging control apparatus and the neighboring apparatus.

14. A non-transitory, computer-readable medium having stored thereon, computer-executable instructions, which when executed by a processor of an imaging control apparatus, cause the processor to execute operations, the operations comprising:
acquiring an infrared image generated by an infrared camera that captures reflected light of infrared rays;
controlling a first setting for the generation of the infrared image based on a control parameter, wherein
the first setting includes at least one of an irradiation wavelength band of the infrared rays, a target wavelength of the infrared image, or an imaging timing of the infrared image; and
transmitting the control parameter to a neighboring apparatus via a communication interface, wherein
the control parameter causes the neighboring apparatus to use a second setting that is at least partially different from the first setting,
a setting priority of the neighboring apparatus is lower than a setting priority of the imaging control apparatus, and
the setting priority of the neighboring apparatus is based on a degree of freedom in setting for the imaging control apparatus and the neighboring apparatus.

15. An imaging control apparatus, comprising:
a processor configured to:
acquire an infrared image generated by an infrared camera that images reflected light of infrared rays;
control a first setting for the generation of the infrared image based on a control parameter, wherein
the first setting includes at least one of an irradiation wavelength band of the infrared rays, a target wavelength of the infrared image, or an imaging timing of the infrared image; and
transmit the control parameter to a neighboring apparatus via a communication interface, wherein
the control parameter causes the neighboring apparatus to use a second setting that is at least partially different from the first setting,
a setting priority of the neighboring apparatus is lower than a setting priority of the imaging control apparatus, and
the setting priority of the neighboring apparatus is based on a setting change risk that depends on a moving speed or a position of each of the imaging control apparatus and the neighboring apparatus.

16. An imaging control apparatus, comprising:
a processor configured to:
acquire an infrared image generated by an infrared camera that images reflected light of infrared rays;
detect a plurality of neighboring apparatuses via a communication interface;
select at least one neighboring apparatus with which competition is to be avoided based on a relative positional relationship between the infrared camera and the detected plurality of neighboring apparatuses; and
control a first setting for the generation of the infrared image based on a control parameter one of transmitted to the at least one neighboring apparatus or received from the at least one neighboring apparatus via the communication interface, wherein the first setting is at least partially different from a second setting used for the at least one neighboring apparatus.

* * * * *